United States Patent
Li et al.

(10) Patent No.: US 11,507,814 B1
(45) Date of Patent: Nov. 22, 2022

(54) NEURAL NETWORK BASED ON TOTAL HAMMING DISTANCE

(71) Applicant: Meta Platforms Technologies, LLC, Menlo Park, CA (US)

(72) Inventors: Meng Li, Union City, CA (US); Yilei Li, Fremont, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 236 days.

(21) Appl. No.: 16/899,806

(22) Filed: Jun. 12, 2020

Related U.S. Application Data

(60) Provisional application No. 62/897,628, filed on Sep. 9, 2019.

(51) Int. Cl.
*G06N 3/063* (2006.01)
*G06F 17/16* (2006.01)
*G06F 7/544* (2006.01)

(52) U.S. Cl.
CPC ........... *G06N 3/063* (2013.01); *G06F 7/5443* (2013.01); *G06F 17/16* (2013.01)

(58) Field of Classification Search
None
See application file for complete search history.

(56) References Cited

U.S. PATENT DOCUMENTS

| | | | |
|---|---|---|---|
| 2018/0189633 A1* | 7/2018 | Henry | G06N 3/0445 |
| 2019/0012296 A1* | 1/2019 | Hsieh | G06N 3/0445 |
| 2019/0073259 A1* | 3/2019 | Qin | G06N 3/02 |
| 2019/0311252 A1* | 10/2019 | Chen | G06N 3/06 |
| 2020/0183734 A1* | 6/2020 | Nemlekar | G06N 3/08 |

FOREIGN PATENT DOCUMENTS

EP 3557485 A1 * 10/2019 ......... G06F 12/0207

* cited by examiner

*Primary Examiner* — Eric Coleman
(74) *Attorney, Agent, or Firm* — Foley & Lardner LLP

(57) ABSTRACT

Disclosed herein includes a system, a method, and a device for improving power efficiency of a neural network implemented in an AI chip. In a neural network, large amounts of computations for multiply and accumulate can result in frequent toggles or transitions in states of logic circuits in the AI chip. Such frequent toggles or transitions of states of logic circuits can cause a large overall power consumption. In one aspect, to minimize the number of toggles, a sequence or order of computations can be rearranged. In one approach, total hamming distances for weights or input strings in different arrangements or sequences can be identified, and an arrangement or a sequence of weights or input strings with a reduced or minimum total hamming distance can be identified. An arrangement or a sequence of weights that render a reduced total hamming distance can be identified.

20 Claims, 16 Drawing Sheets

NEURAL NETWORK BASED ON TOTAL HAMMING DISTANCE

CROSS-REFERENCE TO RELATED APPLICATION

This application claims priority to and the benefit of U.S. Provisional Application No. 62/897,628, filed Sep. 9, 2019, entitled "NEURAL NETWORK BASED ON TOTAL HAMMING DISTANCE", which is incorporated herein by reference in its entirety for all purposes.

FIELD OF DISCLOSURE

The present disclosure is generally related to a neural network, including but not limited to adjusting a computation sequence of an input data stream of a neural network to reduce a total hamming distance, and training a neural network to reduce a total hamming distance.

BACKGROUND

MAC circuitry performs various computations for a neural network. In one example, the MAC circuitry models a node or a neuron of a neural network, and computes a dot product of two input vectors corresponding to, for example, weights and activation values. Computing a dot product involves multiplying weights with corresponding activation values and adding the multiplication results, which may be computationally exhaustive. In one aspect, a neural network having a large number of nodes or neurons implements a large network of MAC circuitries, which may demand or consume a significant amount of power.

SUMMARY

Various embodiments disclosed herein are related to a method for a multiply-accumulate (MAC) operation. In some embodiments, the method includes obtaining, by a sequence generator, a weight matrix. The weight matrix may include a set of weights for a neural network computation. In some embodiments, the method includes determining, by the sequence generator, a sequence of subsets of weights from the set of weights applied to MAC circuitries to reduce a number of bit flips at the MAC circuitries, based on hamming distances of the subsets of weights. In some embodiments, the method includes maintaining, by the sequence generator, the determined sequence to perform MAC operations of the neural network computation by the MAC circuitries.

In some embodiments, the method includes performing, by a MAC circuitry of the MAC circuitries, a first MAC operation with a first subset of weights from the subsets of weights, according to the determined sequence. In some embodiments, the method includes performing, by the MAC circuitry, a second MAC operation with a second subset of weights from the subsets of weights after the first MAC operation, according to the determined sequence.

In some embodiments, obtaining, by the sequence generator, the weight matrix includes segmenting, by the sequence generator, a base weight matrix into a plurality of sub-matrices. The base weight matrix may have a larger number of weights than the weight matrix. The weight matrix may be one of the plurality of sub-matrices. In some embodiments, the method includes determining, by the sequence generator, a number of columns of the base weight matrix. In some embodiments, the base weight matrix is segmented into the plurality of sub-matrices, in response to determining that the number of columns of the weight matrix is larger than a predetermined threshold. In some embodiments, the method includes determining, by the sequence generator, a length of a bit string of weights in a row of the weight matrix. The base weight matrix may be segmented into the plurality of sub-matrices, in response to determining that the length of the bit string of weights in the row is larger than a predetermined threshold.

In some embodiments, the plurality of sub-matrices include an adjacent weight matrix adjacent to the weight matrix. The adjacent weight matrix may include another set of weights. In some embodiments, the method includes determining, by the sequence generator, another sequence of additional subsets of weights from the another set of weights applied to the MAC circuitries to reduce a number of bit flips at the MAC circuitries, based on hamming distances of the additional subsets of weights. The another sequence may be different from the sequence.

In some embodiments, the method includes determining, by the sequence generator, an accumulation sequence indicating an association between a first MAC operation based on a first row of weights of the weight matrix and a second MAC operation based on a second row of weights of the adjacent weight matrix. In some embodiments, the method includes adding, by an adder, a result of the first MAC operation based on the first row of weights of the weight matrix and a second result of the second MAC operation based on the second row of weights, according to the accumulation sequence.

In some embodiments, determining, by the sequence generator, the sequence of the subsets of weights includes generating, by the sequence generator, a temporary matrix having weights of the weight matrix. In some embodiments, determining, by the sequence generator, the sequence of the subsets of weights includes selecting, by the sequence generator, a first row of weights of the temporary matrix. In some embodiments, determining, by the sequence generator, the sequence of the subsets of weights includes determining, by the sequence generator for each of remaining rows of weights of the temporary matrix, a hamming distance with respect to the first row of weights of the temporary matrix. In some embodiments, determining, by the sequence generator, the sequence of the subsets of weights includes determining, by the sequence generator, a row of weights from the remaining rows of the temporary matrix having a smallest hamming distance as a second row of weights of the weight matrix following the first row of weights of the weight matrix.

In some embodiments, determining, by the sequence generator, the sequence of the subsets of weights includes removing, by the sequence generator, the determined row of weights from the temporary matrix. In some embodiments, determining, by the sequence generator, the sequence of the subsets of weights includes determining, by the sequence generator for each of remaining rows of weights of the temporary matrix, a hamming distance with respect to the subsequent row. In some embodiments, determining, by the sequence generator, the sequence of the subsets of weights includes determining, by the sequence generator, another row of the remaining rows of the temporary matrix having a smallest hamming distance as a third row of weights of the weight matrix following the second row of weights of the weight matrix.

Various embodiments disclosed herein are related to a device for MAC operation. In some embodiments, the device includes one or more processors configured to obtain weight matrix. The weight matrix may include a set of weights for a neural network computation. In some embodiments, the one or more processors are configured to determine a sequence of subsets of weights from the set of weights applied to MAC circuitries to reduce a number of bit flips at the MAC circuitries, based on hamming distances of the subsets of weights. In some embodiments, the one or more processors are configured to maintain the determined sequence to perform MAC operations of the neural network computation by the MAC circuitries.

In some embodiments, the device includes the MAC circuitries. A MAC circuitry of the MAC circuitries may be configured to perform a first MAC operation with a first subset of weights from the subsets of weights, according to the determined sequence. In some embodiments, the one or more processors are configured to perform a second MAC operation with a second subset of weights from the subsets of weights after the first MAC operation, according to the determined sequence.

In some embodiments, the one or more processors are configured to obtain the weight matrix by segmenting, dividing or partitioning a base weight matrix into a plurality of sub-matrices. The base weight matrix may have a larger number of weights than the weight matrix. In some embodiments, the weight matrix is one of the plurality of sub-matrices. In some embodiments, the one or more processors are further configured to determine a number of columns of the base weight matrix. In some embodiments, the base weight matrix is segmented into the plurality of sub-matrices, in response to determining that the number of columns of the weight matrix is larger than a predetermined threshold. In some embodiments, the one or more processors are configured to determine a length of a bit string of weights in a row of the weight matrix. In some embodiments, the one or more processors are configured to segment the base weight matrix into the plurality of sub-matrices, in response to determining that the length of the bit string of weights in the row is larger than a predetermined threshold.

In some embodiments, the plurality of sub-matrices include an adjacent weight matrix adjacent to the weight matrix. The adjacent weight matrix may include another set of weights. In some embodiments, the one or more processors are further configured to determine another sequence of additional subsets of weights from the another set of weights applied to the MAC circuitries to reduce a number of bit flips at the MAC circuitries, based on hamming distances of the additional subsets of weights. The another sequence may be different from the sequence.

In some embodiments, the one or more processors are configured to determine an accumulation sequence indicating an association between a first MAC operation based on a first row of weights of the weight matrix and a second MAC operation based on a second row of weights of the adjacent weight matrix. In some embodiments, the device includes an adder configured to add a result of the first MAC operation based on the first row of weights of the weight matrix and a second result of the second MAC operation based on the second row of weights, according to the accumulation sequence.

In some embodiments, the one or more processors are configured to determine the sequence of the subsets of weights by generating a temporary matrix having weights of the weight matrix. In some embodiments, the one or more processors are configured to determine the sequence of the subsets of weights by selecting a first row of weights of the temporary matrix. In some embodiments, the one or more processors are configured to determine the sequence of the subsets of weights by determining, for each of remaining rows of weights of the temporary matrix, a hamming distance with respect to the first row of weights of the temporary matrix. In some embodiments, the one or more processors are configured to determine the sequence of the subsets of weights by determining a row of weights from the remaining rows of the temporary matrix having a smallest hamming distance as a second row of weights of the weight matrix following the first row of weights of the weight matrix. In some embodiments, the one or more processors are configured to determine the sequence of the subsets of weights by removing the determined row of weights from the temporary matrix. In some embodiments, the one or more processors are configured to determine the sequence of the subsets of weights by determining, for each of remaining rows of weights of the temporary matrix, a hamming distance with respect to the subsequent row. In some embodiments, the one or more processors are configured to determine the sequence of the subsets of weights by determining another row of the remaining rows of the temporary matrix having a smallest hamming distance as a third row of weights of the weight matrix following the second row of weights of the weight matrix.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes an environment, system, configuration and/or other aspects useful for practicing or implementing an embodiment of the present systems, methods and devices; and Section B describes embodiments of devices, systems and methods for determining a sequence of weights applied for neural network computation to reduce a total hamming distance.

Section C describes embodiments of devices, systems and methods for training a neural network to reduce a total hamming distance.

A. Environment for Artificial Intelligence Related Processing

Figure 1A:
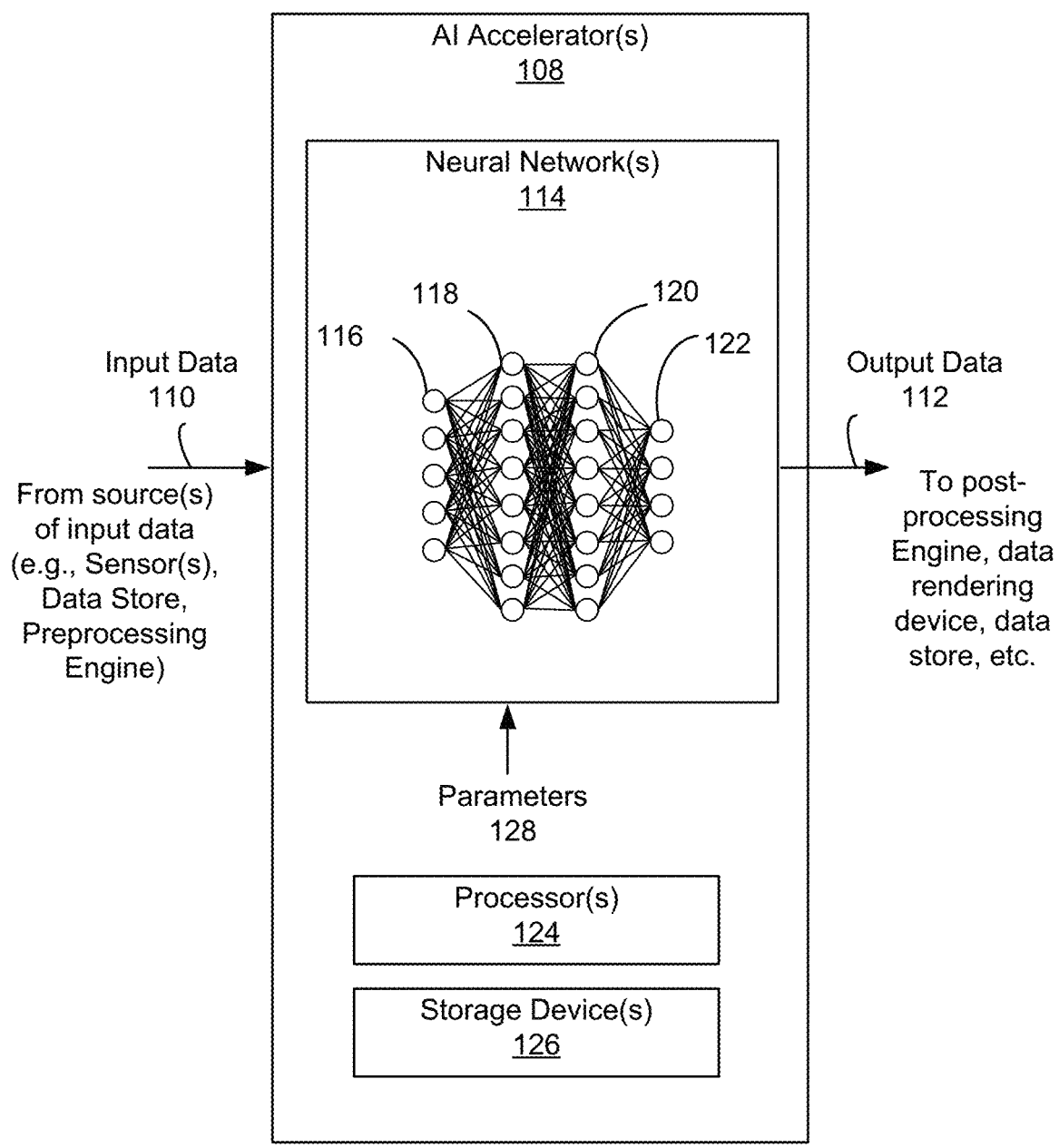
FIG. 1A is a block diagram of an embodiment of a system for performing artificial intelligence (AI) related processing, according to an example implementation of the present disclosure.

Prior to discussing the specifics of embodiments of systems, devices and/or methods in Section B, it may be helpful to discuss the environments, systems, configurations and/or other aspects useful for practicing or implementing certain embodiments of the systems, devices and/or methods. Referring now to FIG. 1A, an embodiment of a system for performing artificial intelligence (AI) related processing is depicted. In brief overview, the system includes one or more AI accelerators 108 that can perform AI related processing using input data 110. Although referenced as an AI accelerator 108, it is sometimes referred as a neural network accelerator (NNA), neural network chip or hardware, AI processor, AI chip, etc. The AI accelerator(s) 108 can perform AI related processing to output or provide output data 112, according to the input data 110 and/or parameters 128 (e.g., weight and/or bias information). An AI accelerator 108 can include and/or implement one or more neural networks 114 (e.g., artificial neural networks), one or more processor(s) 24 and/or one or more storage devices 126.

Each of the above-mentioned elements or components is implemented in hardware, or a combination of hardware and software. For instance, each of these elements or components can include any application, program, library, script, task, service, process or any type and form of executable instructions executing on hardware such as circuitry that can include digital and/or analog elements (e.g., one or more transistors, logic gates, registers, memory devices, resistive elements, conductive elements, capacitive elements).

The input data 110 can include any type or form of data for configuring, tuning, training and/or activating a neural network 114 of the AI accelerator(s) 108, and/or for processing by the processor(s) 124. The neural network 114 is sometimes referred to as an artificial neural network (ANN). Configuring, tuning and/or training a neural network can refer to or include a process of machine learning in which training data sets (e.g., as the input data 110) such as historical data are provided to the neural network for processing. Tuning or configuring can refer to or include training or processing of the neural network 114 to allow the neural network to improve accuracy. Tuning or configuring the neural network 114 can include, for example, designing, forming, building, synthesizing and/or establishing the neural network using architectures that have proven to be successful for the type of problem or objective desired for the neural network 114. In some cases, the one or more neural networks 114 may initiate at a same or similar baseline model, but during the tuning, training or learning process, the results of the neural networks 114 can be sufficiently different such that each neural network 114 can be tuned to process a specific type of input and generate a specific type of output with a higher level of accuracy and reliability as compared to a different neural network that is either at the baseline model or tuned or trained for a different objective or purpose. Tuning the neural network 114 can include setting different parameters 128 for each neural network 114, fine-tuning the parameters 128 differently for each neural network 114, or assigning different weights (e.g., hyperparameters, or learning rates), tensor flows, etc. Thus, setting appropriate parameters 128 for the neural network(s) 114 based on a tuning or training process and the objective of the neural network(s) and/or the system, can improve performance of the overall system.

A neural network 114 of the AI accelerator 108 can include any type of neural network including, for example, a convolution neural network (CNN), deep convolution network, a feed forward neural network (e.g., multilayer perceptron (MLP)), a deep feed forward neural network, a radial basis function neural network, a Kohonen self-organizing neural network, a recurrent neural network, a modular neural network, a long/short term memory neural network, etc. The neural network(s) 114 can be deployed or used to perform data (e.g., image, audio, video) processing, object or feature recognition, recommender functions, data or image classification, data (e.g., image) analysis, etc., such as natural language processing.

As an example, and in one or more embodiments, the neural network 114 can be configured as or include a convolution neural network. The convolution neural network can include one or more convolution cells (or pooling layers) and kernels, that can each serve a different purpose. The convolution neural network can include, incorporate and/or use a convolution kernel (sometimes simply referred as "kernel"). The convolution kernel can process input data, and the pooling layers can simplify the data, using, for example, non-linear functions such as a max, thereby reducing unnecessary features. The neural network 114 including the convolution neural network can facilitate image, audio or any data recognition or other processing. For example, the input data 110 (e.g., from a sensor) can be passed to convolution layers of the convolution neural network that form a funnel, compressing detected features in the input data 110. The first layer of the convolution neural network can detect first characteristics, the second layer can detect second characteristics, and so on.

The convolution neural network can be a type of deep, feed-forward artificial neural network configured to analyze visual imagery, audio information, and/or any other type or form of input data 110. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other data classification/processing algorithms, the convolution neural network can automatically learn the filters that may be hand-engineered for other data classification/processing algorithms, thereby improving the efficiency associated with configuring, establishing or setting up the neural network 114, thereby providing a technical advantage relative to other data classification/processing techniques.

The neural network 114 can include an input layer 116 and an output layer 122, of neurons or nodes. The neural network 114 can also have one or more hidden layers 118, 119 that can include convolution layers, pooling layers, fully connected layers, and/or normalization layers, of neurons or nodes. In a neural network 114, each neuron can receive input from some number of locations in the previous layer. In a fully connected layer, each neuron can receive input from every element of the previous layer.

Each neuron in a neural network 114 can compute an output value by applying some function to the input values coming from the receptive field in the previous layer. The function that is applied to the input values is specified by a vector of weights and a bias (typically real numbers). Learning (e.g., during a training phase) in a neural network 114 can progress by making incremental adjustments to the biases and/or weights. The vector of weights and the bias can be called a filter and can represent some feature of the input (e.g., a particular shape). A distinguishing feature of convolutional neural networks is that many neurons can share the same filter. This reduces memory footprint because a single bias and a single vector of weights can be used across all receptive fields sharing that filter, rather than each receptive field having its own bias and vector of weights.

For example, in a convolution layer, the system can apply a convolution operation to the input layer 116, passing the result to the next layer. The convolution emulates the response of an individual neuron to input stimuli. Each convolutional neuron can process data only for its receptive field. Using the convolution operation can reduce the number of neurons used in the neural network 114 as compared to a fully connected feedforward neural network. Thus, the convolution operation can reduce the number of free parameters, allowing the network to be deeper with fewer parameters. For example, regardless of an input data (e.g., image data) size, tiling regions of size 5×5, each with the same shared weights, may use only 25 learnable parameters. In this way, the first neural network 114 with a convolution neural network can resolve the vanishing or exploding gradients problem in training traditional multi-layer neural networks with many layers by using backpropagation.

The neural network 114 (e.g., configured with a convolution neural network) can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The neural network 114 (e.g., configured with a convolution neural network) can include fully connected layers. Fully connected layers can connect every neuron in one layer to every neuron in another layer. The neural network 114 can be configured with shared weights in convolutional layers, which can refer to the same filter being used for each receptive field in the layer, thereby reducing a memory footprint and improving performance of the first neural network 114.

The hidden layers 118, 119 can include filters that are tuned or configured to detect information based on the input data (e.g., sensor data, from a virtual reality system for instance). As the system steps through each layer in the neural network 114 (e.g., convolution neural network), the system can translate the input from a first layer and output the transformed input to a second layer, and so on. The neural network 114 can include one or more hidden layers 118, 119 based on the type of object or information being detected, processed and/or computed, and the type of input data 110.

In some embodiments, the convolutional layer is the core building block of a neural network 114 (e.g., configured as a CNN). The layer's parameters 128 can include a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the neural network 114 can learn filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map. In a convolutional layer, neurons can receive input from a restricted subarea of the previous layer. Typically, the subarea is of a square shape (e.g., size 5 by 5). The input area of a neuron is called its receptive field. So, in a fully connected layer, the receptive field is the entire previous layer. In a convolutional layer, the receptive area can be smaller than the entire previous layer.

The first neural network 114 can be trained to detect, classify, segment and/or translate input data 110 (e.g., by detecting or determining the probabilities of objects, events, words and/or other features, based on the input data 110). For example, the first input layer 116 of neural network 114 can receive the input data 110, process the input data 110 to transform the data to a first intermediate output, and forward the first intermediate output to a first hidden layer 118. The first hidden layer 118 can receive the first intermediate output, process the first intermediate output to transform the first intermediate output to a second intermediate output, and forward the second intermediate output to a second hidden layer 119. The second hidden layer 119 can receive the second intermediate output, process the second intermediate output to transform the second intermediate output to a third intermediate output, and forward the third intermediate output to an output layer 122 for example. The output layer 122 can receive the third intermediate output, process the third intermediate output to transform the third intermediate output to output data 112, and forward the output data 112 (e.g., possibly to a post-processing engine, for rendering to a user, for storage, and so on). The output data 112 can include object detection data, enhanced/translated/augmented data, a recommendation, a classification, and/or segmented data, as examples.

Referring again to FIG. 1A, the AI accelerator 108 can include one or more storage devices 126. A storage device 126 can be designed or implemented to store, hold or maintain any type or form of data associated with the AI accelerator(s) 108. For example, the data can include the input data 110 that is received by the AI accelerator(s) 108, and/or the output data 112 (e.g., before being output to a next device or processing stage). The data can include intermediate data used for, or from any of the processing stages of a neural network(s) 114 and/or the processor(s) 124. The data can include one or more operands for input to and processing at a neuron of the neural network(s) 114, which can be read or accessed from the storage device 126. For example, the data can include input data, weight information and/or bias information, activation function information, and/or parameters 128 for one or more neurons (or nodes) and/or layers of the neural network(s) 114, which can be stored in and read or accessed from the storage device 126. The data can include output data from a neuron of the neural network(s) 114, which can be written to and stored at the storage device 126. For example, the data can include activation data, refined or updated data (e.g., weight information and/or bias information from a training phase for example, activation function information, and/or other parameters 128) for one or more neurons (or nodes) and/or layers of the neural network(s) 114, which can be transferred or written to, and stored in the storage device 126.

In some embodiments, the AI accelerator 108 can include one or more processors 124. The one or more processors 124 can include any logic, circuitry and/or processing component (e.g., a microprocessor) for pre-processing input data for any one or more of the neural network(s) 114 or AI accelerator(s) 108, and/or for post-processing output data for any one or more of the neural network(s) 114 or AI accelerator(s) 108. The one or more processors 124 can provide logic, circuitry, processing component and/or functionality for configuring, controlling and/or managing one or more operations of the neural network(s) 114 or AI accelerator(s) 108. For instance, a processor 124 may receive data or signals associated with a neural network 114 to control or reduce power consumption (e.g., via clock-gating controls on circuitry implementing operations of the neural network 114). As another example, a processor 124 may partition and/or re-arrange data for separate processing (e.g., at various components of an AI accelerator 108, in parallel for example), sequential processing (e.g., on the same component of an AI accelerator 108, at different times or stages), or for storage in different memory slices of a storage device, or in different storage devices. In some embodiments, the processor(s) 124 can configure a neural network 114 to operate for a particular context, provide a certain type of processing, and/or to address a specific type of input data, e.g., by identifying, selecting and/or loading specific weight, activation function and/or parameter information to neurons and/or layers of the neural network 114.

In some embodiments, the AI accelerator 108 is designed and/or implemented to handle or process deep learning and/or AI workloads. For example, the AI accelerator 108 can provide hardware acceleration for artificial intelligence applications, including artificial neural networks, machine vision and machine learning. The AI accelerator 108 can be configured for operation to handle robotics related, internet of things (IoT) related, and other data-intensive or sensor-driven tasks. The AI accelerator 108 may include a multi-core or multiple processing element (PE) design, and can be incorporated into various types and forms of devices such as artificial reality (e.g., virtual, augmented or mixed reality) systems, smartphones, tablets, and computers. Certain embodiments of the AI accelerator 108 can include or be implemented using at least one digital signal processor (DSP), co-processor, microprocessor, computer system, heterogeneous computing configuration of processors, graphics processing unit (GPU), field-programmable gate array (FPGA), and/or application-specific integrated circuit (ASIC). The AI accelerator 108 can be a transistor based, semiconductor based and/or a quantum computing based device.

Figure 1B:
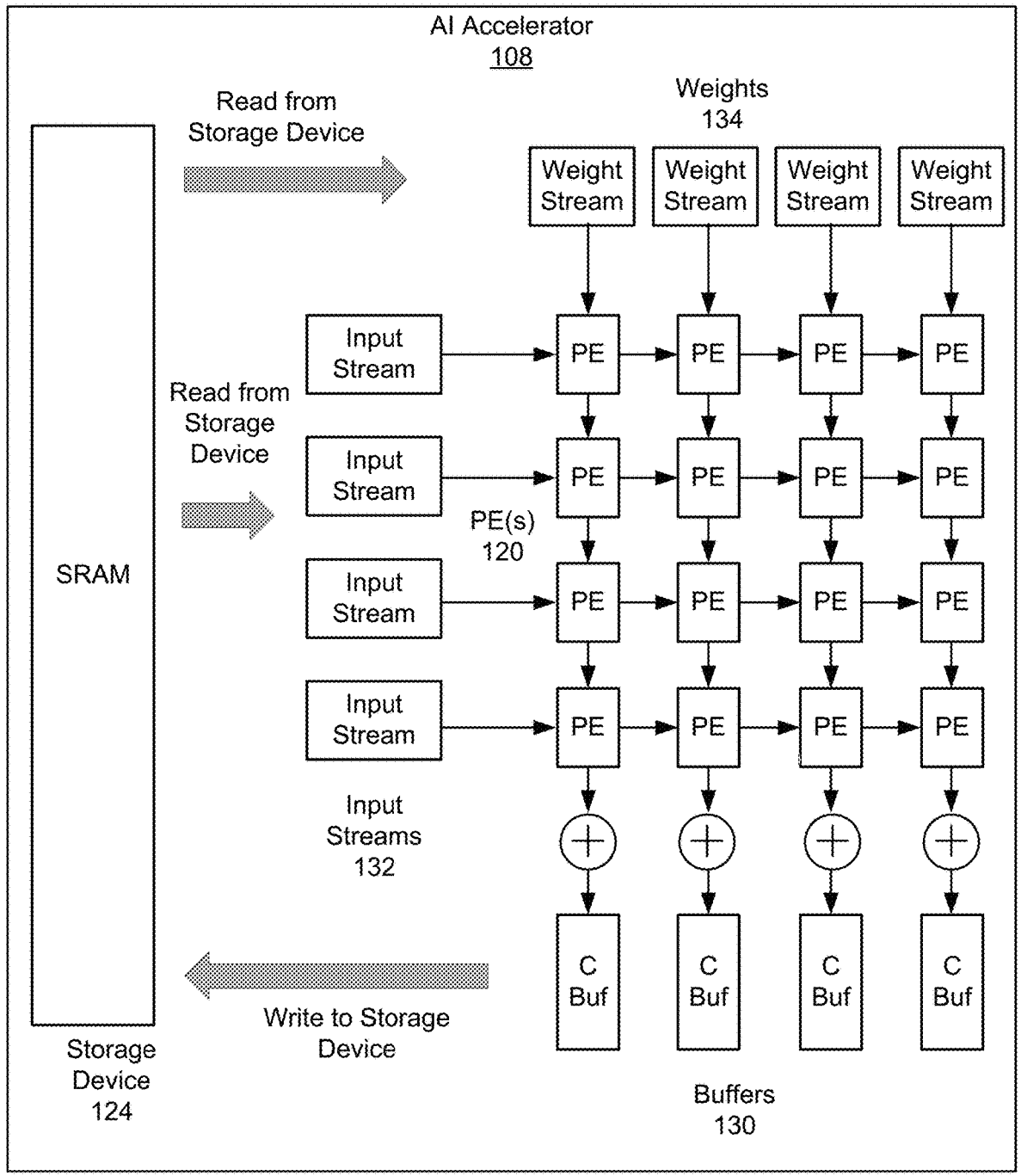
FIG. 1B is a block diagram of an embodiment of a device for performing AI related processing, according to an example implementation of the present disclosure.

Referring now to FIG. 1B, an example embodiment of a device for performing AI related processing is depicted. In brief overview, the device can include or correspond to an AI accelerator 108, e.g., with one or more features described above in connection with FIG. 1A. The AI accelerator 108 can include one or more storage devices 126 (e.g., memory such as a static random-access memory (SRAM) device), one or more buffers, a plurality or array of processing element (PE) circuits, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In a neural network 114 (e.g., artificial neural network) implemented in the AI accelerator 108, neurons can take various forms and can be referred to as processing elements (PEs) or PE circuits. The neuron can be implemented as a corresponding PE circuit, and the processing/activation that can occur at the neuron can be performed at the PE circuit. The PEs are connected into a particular network pattern or array, with different patterns serving different functional purposes. The PE in an artificial neural network operate electrically (e.g., in the embodiment of a semiconductor implementation), and may be either analog, digital, or a hybrid. To parallel the effect of a biological synapse, the connections between PEs can be assigned multiplicative weights, which can be calibrated or "trained" to produce the proper system output.

A PE can be defined in terms of the following equations (e.g., which represent a McCulloch-Pitts model of a neuron):

$$\zeta = \Sigma_i w_i x_i \qquad (1)$$

$$y = \sigma(\zeta) \qquad (2)$$

Where $\zeta$ is the weighted sum of the inputs (e.g., the inner product of the input vector and the tap-weight vector), and GO is a function of the weighted sum. Where the weight and input elements form vectors w and x, the $\zeta$ weighted sum becomes a simple dot product:

$$\zeta = w \cdot x \qquad (3)$$

This may be referred to as either the activation function (e.g., in the case of a threshold comparison) or a transfer function. In some embodiments, one or more PEs can be referred to as a dot product engine. The input (e.g., input data 110) to the neural network 114, x, can come from an input space and the output (e.g., output data 112) are part of the output space. For some neural networks, the output space Y may be as simple as {0, 1}, or it may be a complex multi-dimensional (e.g., multiple channel) space (e.g., for a convolutional neural network). Neural networks tend to have one input per degree of freedom in the input space, and one output per degree of freedom in the output space.

In some embodiments, the PEs can be arranged and/or implemented as a systolic array. A systolic array can be a network (e.g., a homogeneous network) of coupled data processing units (DPUs) such as PEs, called cells or nodes. Each node or PE can independently compute a partial result as a function of the data received from its upstream neighbors, can store the result within itself and can pass the result downstream for instance. The systolic array can be hard-wired or software configured for a specific application. The nodes or PEs can be fixed and identical, and interconnect of the systolic array can be programmable. Systolic arrays can rely on synchronous data transfers.

Referring again to FIG. 1B, the input x to a PE 120 can be part of an input stream 132 that is read or accessed from a storage device 126 (e.g., SRAM). An input stream 132 can be directed to one row (horizontal bank or group) of PEs, and can be shared across one or more of the PEs, or partitioned into data portions (overlapping or non-overlapping data portions) as inputs for respective PEs. Weights 134 (or weight information) in a weight stream (e.g., read from the storage device 126) can be directed or provided to a column (vertical bank or group) of PEs. Each of the PEs in the column may share the same weight 134 or receive a corresponding weight 134. The input and/or weight for each target PE can be directly routed (e.g., from the storage device 126) to the target PE (e.g., without passing through other PE(s)), or can be routed through one or more PEs (e.g., along a row or column of PEs) to the target PE. The output of each PE can be routed directly out of the PE array (e.g., without passing through other PE(s)), or can be routed through one or more PEs (e.g., along a column of PEs) to exit the PE array. The outputs of each column of PEs can be summed or added at an adder circuitry of the respective column, and provided to a buffer 130 for the respective column of PEs. The buffer(s) 130 can provide, transfer, route, write and/or store the received outputs to the storage device 126. In some embodiments, the outputs (e.g., activation data from one layer of the neural network) that are stored by the storage device 126 can be retrieved or read from the storage device 126, and be used as inputs to the array of PEs 120 for processing (of a subsequent layer of the neural network) at a later time. In certain embodiments, the outputs that are stored by the storage device 126 can be retrieved or read from the storage device 126 as output data 112 for the AI accelerator 108.

Figure 1C:
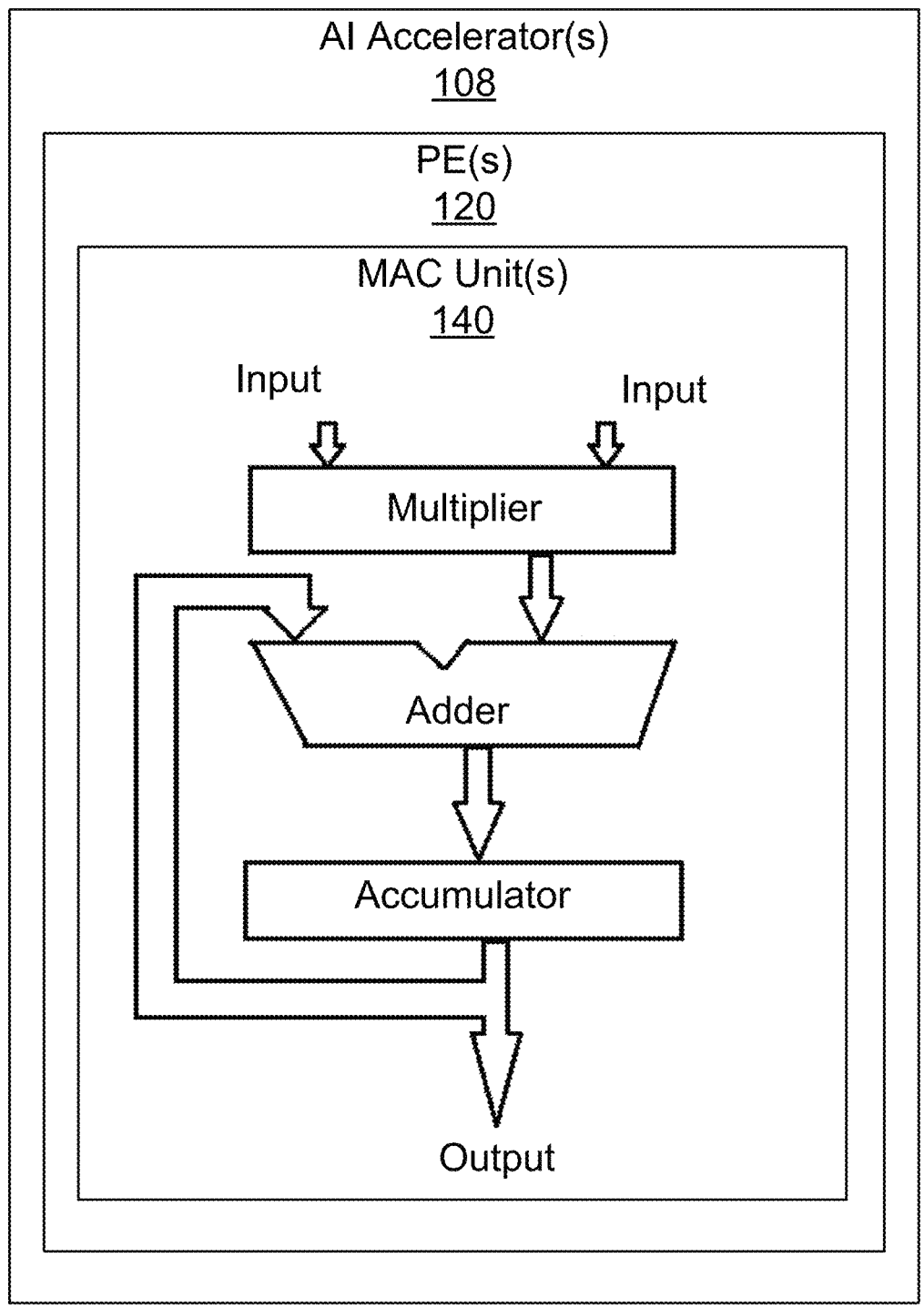
FIG. 1C is a block diagram of an embodiment of a device for performing AI related processing, according to an example implementation of the present disclosure.

Referring now to FIG. 1C, one example embodiment of a device for performing AI related processing is depicted. In brief overview, the device can include or correspond to an AI accelerator 108, e.g., with one or more features described above in connection with FIGS. 1A and 1B. The AI accelerator 108 can include one or more PEs 120, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In some embodiments, a PE 120 can include one or more multiply-accumulate (MAC) units or circuits 140. One or more PEs can sometimes be referred to (singly or collectively) as a MAC engine. A MAC unit is configured to perform multiply-accumulate operation(s). The MAC unit can include a multiplier circuit, an adder circuit and/or an accumulator circuit. The multiply-accumulate operation computes the product of two numbers and adds that product to an accumulator. The MAC operation can be represented as follows, in connection with an accumulator operand a, and inputs b and c:

$$a \leftarrow a+(b \times c) \qquad (4)$$

In some embodiments, a MAC unit 140 may include a multiplier implemented in combinational logic followed by an adder (e.g., that includes combinational logic) and an accumulator register (e.g., that includes sequential and/or combinational logic) that stores the result. The output of the accumulator register can be fed back to one input of the adder, so that on each clock cycle, the output of the multiplier can be added to the accumulator register.

As discussed above, a MAC unit 140 can perform both multiply and addition functions. The MAC unit 140 can operate in two stages. The MAC unit 140 can first compute the product of given numbers (inputs) in a first stage, and forward the result for the second stage operation (e.g., addition and/or accumulate). An n-bit MAC unit 140 can include an n-bit multiplier, 2n-bit adder, and 2n-bit accumulator. An array or plurality of MAC units 140 (e.g., in PEs) can be arranged in a systolic array, for parallel integration, convolution, correlation, matrix multiplication, data sorting, and/or data analysis tasks.

Figure 1D:
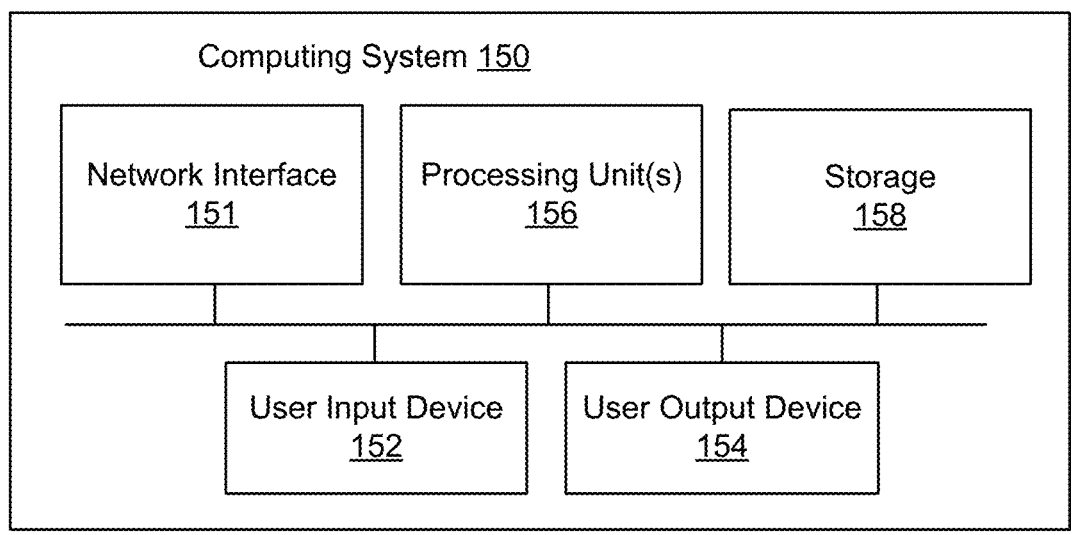
FIG. 1D is a block diagram of a computing environment according to an example implementation of the present disclosure.

Various systems and/or devices described herein can be implemented in a computing system. FIG. 1D shows a block diagram of a representative computing system 150. In some embodiments, the system of FIG. 1A can form at least part of the processing unit(s) 156 (or processors 156) of the computing system 150. Computing system 150 can be implemented, for example, as a device (e.g., consumer device) such as a smartphone, other mobile phone, tablet computer, wearable computing device (e.g., smart watch, eyeglasses, head mounted display), desktop computer, laptop computer, or implemented with distributed computing devices. The computing system 150 can be implemented to provide VR, AR, MR experience. In some embodiments, the computing system 150 can include conventional, specialized or custom computer components such as processors 156, storage device 158, network interface 151, user input device 152, and user output device 154.

Network interface 151 can provide a connection to a local/wide area network (e.g., the Internet) to which network interface of a (local/remote) server or back-end system is also connected. Network interface 151 can include a wired interface (e.g., Ethernet) and/or a wireless interface implementing various RF data communication standards such as Wi-Fi, Bluetooth, or cellular data network standards (e.g., 3G, 4G, 5G, LTE, etc.).

User input device 152 can include any device (or devices) via which a user can provide signals to computing system 150; computing system 150 can interpret the signals as indicative of particular user requests or information. User input device 152 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 154 can include any device via which computing system 150 can provide information to a user. For example, user output device 154 can include a display to display images generated by or delivered to computing system 150. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. User output devices 154 can be provided in addition to or instead of a display. Examples include indicator lights, speakers, tactile "display" devices, printers, and so on.

Some implementations include electronic components, such as microprocessors, storage and memory that store computer program instructions in a non-transitory computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 156 can provide various functionality for computing system 150, including any of the functionality described herein as being performed by a server or client, or other functionality associated with message management services.

It will be appreciated that computing system 150 is illustrative and that variations and modifications are possible. Computer systems used in connection with the present disclosure can have other capabilities not specifically described here. Further, while computing system 150 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

B. Reducing Energy Consumption of an Input Data Stream of a Neural Network

Disclosed herein are related to systems and methods for improving power efficiency of a neural network implemented in an AI chip. In a neural network, large amounts of computations for multiply and accumulate can result in frequent toggles or transitions in states of logic circuits in the AI chip. Such frequent toggles or transitions of states of logic circuits can cause a large overall power consumption. In one aspect, to minimize the number of toggles, a sequence or order of computations can be rearranged. In one approach, total hamming distances for weights or input strings in different arrangements or sequences can be identified, and an arrangement or a sequence of weights or input strings with a reduced or minimum total hamming distance can be identified. An arrangement or a sequence of weights that render a reduced total hamming distance (as compared to the original/previous arrangement or sequence) can be identified through naive greedy search, exhaustive search, integer linear programming, evolution algorithm, annealing algorithm, etc. Although this disclosure may reference weights and weight matrices in various embodiments, this is only by way of illustration and not intended to be limiting in any way. Computational/input/vector/matrix elements other than weights (such as activation values) are contemplated and can be processed similarly.

In one aspect, a configuration of weights or input strings/arrays (e.g., vector/matrix elements) can be further segmented or partitioned to improve efficiency of identifying an arrangement or sequence of weights or input strings that render a reduced or minimum total hamming distance. In one aspect, the efficiency of search for the arrangement or the sequence (rendering the reduced total hamming distance) can be improved by increasing a number of input lists (or a number of rows for a matrix for instance) and decreasing a number of elements per input lists (or a number of columns for a matrix for instance). In one approach, a large set of weights or input strings can be segmented adaptively or in a predetermined way such that a number of elements per input lists (or a number of columns) can be reduced to improve the search efficiency.

By analyzing basic operations of digital circuitry in arithmetic data path logic, total hamming distance of an input sequence can be determined according to bit flipping count, and therefore energy consumption of arithmetic computation in an AI accelerator can be determined according to the total hamming distance. In one aspect, an algorithm-hardware co-design method disclosed herein can reduce total hamming distance of an input sequence or input data stream (for example, weights and activation inputs), which can reduce energy consumption of an AI accelerator's datapath.

Energy-efficient acceleration in neural network computation is an important factor for on-device AI. In an (AI) accelerator, datapath logic operations for arithmetic computation plays a major part in total energy consumption. For representative networks (for example, eye tracking for AR application), MAC energy consumption can occupy 30-50% of total energy. Therefore, energy optimization for datapath logic is important for overall energy efficiency of an accelerator.

Figure 2:
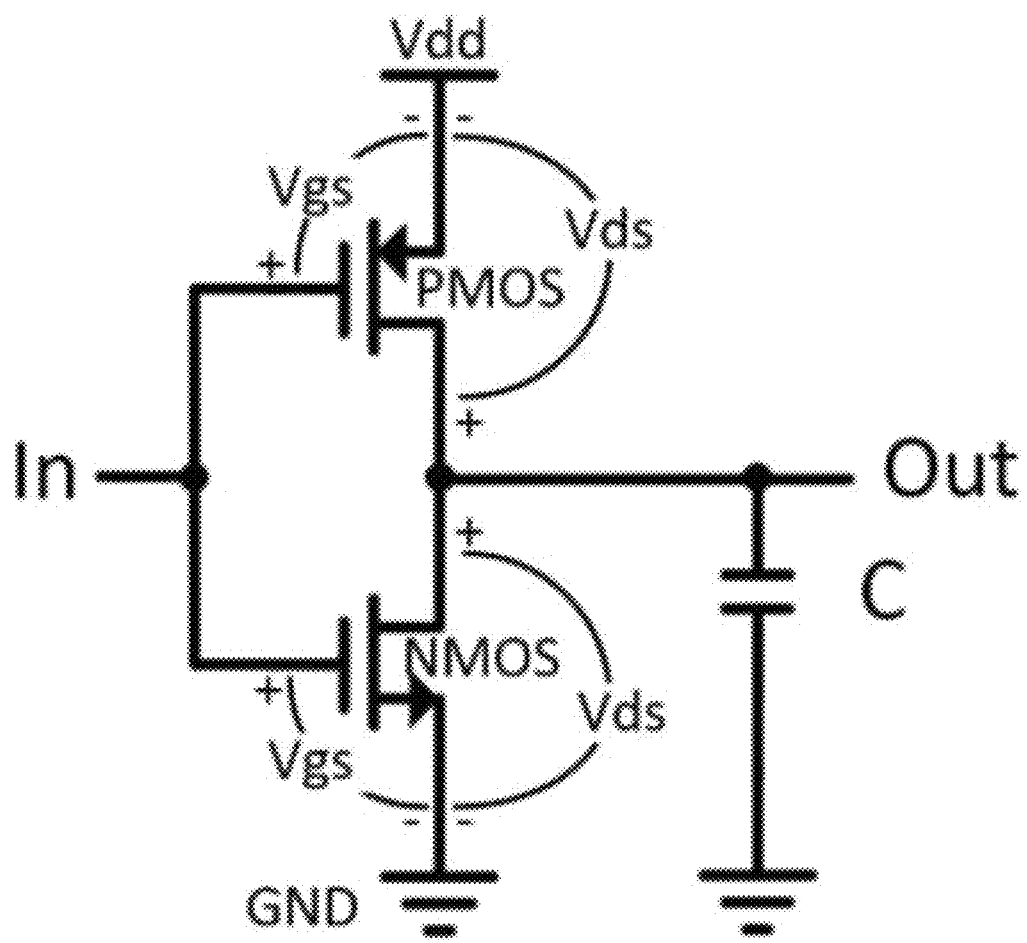
FIG. 2 is an example inverter circuit, according to an example implementation of the present disclosure.

FIG. 2 is an example inverter circuit 200, according to an example implementation of the present disclosure. In one aspect, a digital circuit such as the inverter circuit 200 includes P-type transistors (e.g., PMOS or P-type FinFET) and N-type transistors (e.g., NMOS or N-type FinFET) with capacitance loading. For a datapath associated with digital circuitry, energy consumption includes following components: switching (or toggling), glitch, and leakage. In one aspect, switching or toggling includes a transition in states (e.g., from "0" to "1" or "1" to "0") of a digital circuit can be physically represented by a charged/discharged capacitor. When an output or internal state changes from "0" to "1", or from "1" to "0" (bit flip), a capacitor is charged or discharged. Such charging or discharging renders an energy cost corresponding to $½CV^2$. In one aspect, glitch involves a short-circuit current through a P-type transistor and an N-type transistor. For example, when bit flips happen at an input of a P-type transistor and an N-type transistor, P-type transistor and N-type transistor can be simultaneously turned on for a short period, causing short-circuit current and energy dissipation. In one aspect, leakage involves leakage of current, for example, through parasitic resistances of the transistors. Leakage contribution to energy consumption in datapath logic circuitry (sometimes referred to as datapath) may be orders of magnitude smaller than glitch/switching contribution and can be ignored. In one aspect, a bit flip due to switching or toggling contributes to a large portion of energy consumption of the digital circuit.

Figure 3C:
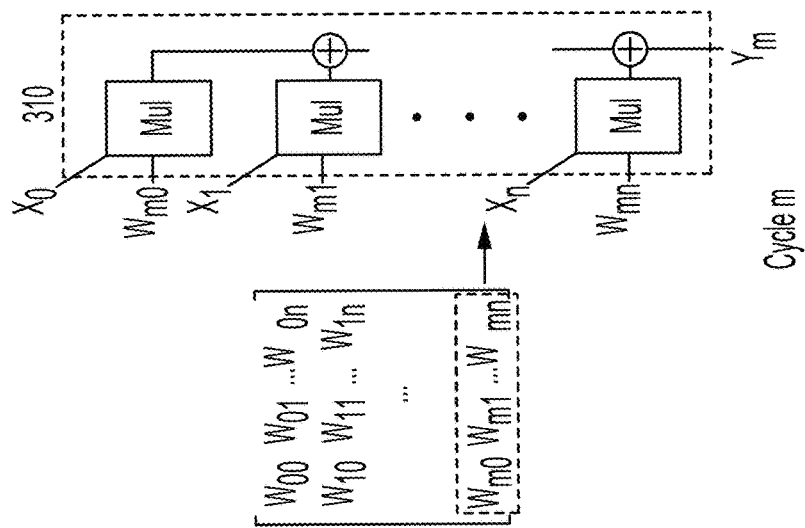
FIGS. 3A-3C show an example single column array for multiplying pre-filled inputs with a row of a weight matrix per cycle, according to an example implementation of the present disclosure.
Figure 3B:
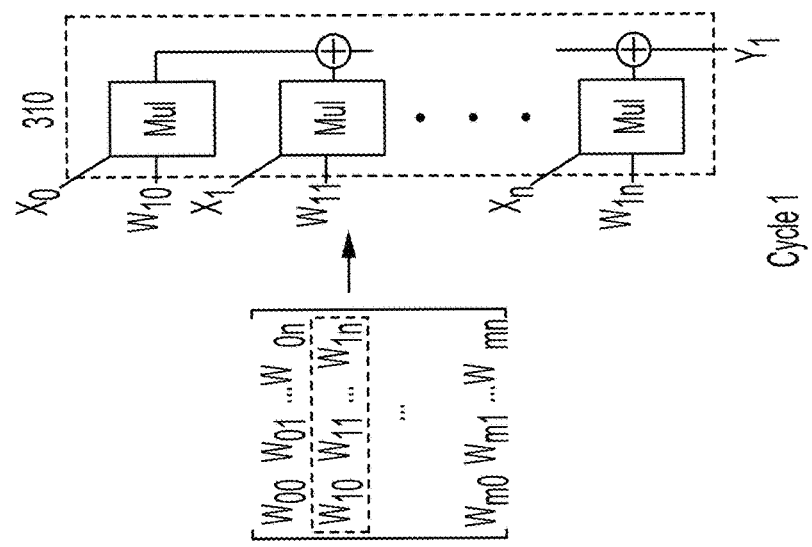
Figure 3A:
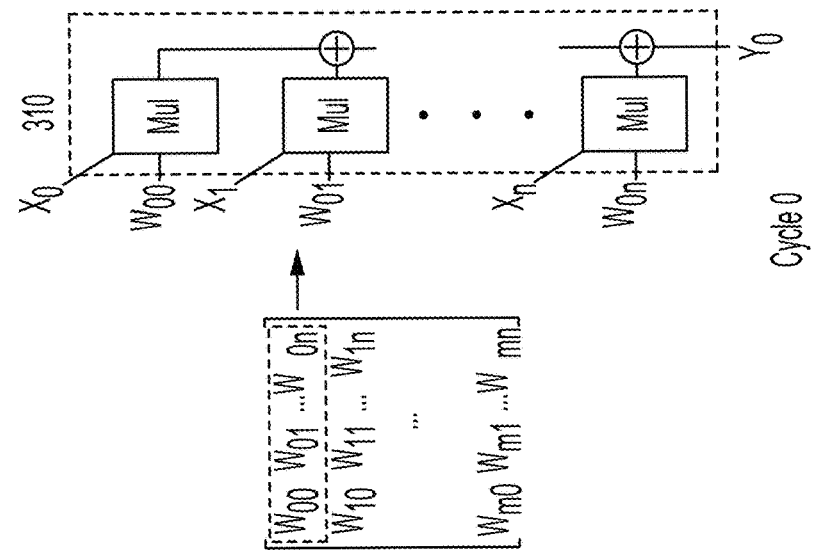

FIGS. 3A-3C show an example single column array for multiplying pre-filled inputs with a row of a weight matrix per cycle, according to an example implementation of the present disclosure. In one aspect, an input data pattern may be highly correlated to bit flip in datapath circuits. Accordingly, energy consumption of datapath circuits may depend on input data pattern. Consider a matrix-vector multiplier as an example:

$$\begin{bmatrix} W_{00} & W_{01} & \dots & W_{0n} \\ W_{10} & W_{11} & \dots & W_{1n} \\ \vdots & \vdots & \ddots & \vdots \\ W_{m0} & W_{m1} & \dots & W_{mn} \end{bmatrix} * \begin{bmatrix} X_0 \\ X_1 \\ \vdots \\ X_n \end{bmatrix} = \begin{bmatrix} Y_0 \\ Y_1 \\ \vdots \\ Y_m \end{bmatrix}$$

where a data vector X is multiplied by a weight matrix W including weights $W_{00} \dots W_{mn}$, to obtain a vector Y. In one aspect, this operation can be mapped to a mini systolic array with a single column.

An example operation of the array is shown in FIGS. 3A-3C. For example, a MAC circuit 310 including n+1 number of multiplier circuits and n number of adder circuits is applied with input data $X_0 \dots X_n$ of the data vector, respectively. In one configuration, each multiplier circuit includes a first input and a second input, where the first input is applied with a corresponding input data X. The second input of the multiplier circuit may be applied with different weights during different clock cycles. For example, as shown in FIG. 3A, during a clock cycle 0, weights $W_{00}$, $W_{01} \dots W_{0n}$ in a first row of the weight matrix W are applied to corresponding second inputs of the multiplier circuits, respectively. For example, as shown in FIG. 3B, during a clock cycle 1, weights $W_{10}$, $W_{11} \dots W_{1n}$ in a second row of the weight matrix W are applied to corresponding second inputs of the multiplier circuits, respectively. For example, as shown in FIG. 3C, during a clock cycle m, weights $W_{m0}$, $W_{m1} \dots W_{mn}$ in a $m^{th}$ row of the weight matrix W are applied to corresponding second inputs of the multiplier circuits, respectively. Accordingly, a number of MAC circuitries for performing neural network computation can be conserved by sharing or reusing MAC circuitries during different clock cycles. Moreover, a number of toggles at the first inputs of the multiplier circuits can be obviated, because input data X are applied to the first inputs of the multiplier circuits. Hence, energy consumption due to switching or toggling at the first inputs of the multiplier circuits can be reduced.

In one aspect, energy consumption due to switching or toggling at second inputs of the multipliers can be reduced by reordering or rearranging weights applied to the second inputs of the multipliers. For example, rows of the weight matrix applied to the second inputs of the multipliers can be rearranged or sequenced to reduce a number of bit flips. In one approach, rows of the weight matrix applied to the second inputs of the multipliers can be rearranged or sequenced to reduce total hamming distance (THD).

A hamming distance H(a,b) between two bit strings may be the number of different bits. For an input/weight-array, total Hamming Distance can be defined as the sum of Hamming distances between neighboring weight/input bit strings in the sequence. For a sequence of (00,01,10,11), the total Hamming distance THD(00,01,10,11) is H(00,01)+H (01,10)+H(10,11)=1+2+1=4. By rearranging or adjusting a sequence of weights applied for MAC operation to reduce the total hamming distance, a number of bit flips and energy consumption can be reduced.

Assuming for an example, let $$X = \begin{bmatrix} 0001 \\ 0001 \\ 0001 \\ 0001 \end{bmatrix}, W = \begin{bmatrix} 0000 & 0000 & 0000 & 0000 \\ 1111 & 1111 & 1111 & 1111 \\ 0000 & 0000 & 0000 & 0000 \\ 1111 & 1111 & 1111 & 1111 \end{bmatrix} = \begin{bmatrix} W_0 \\ W_1 \\ W_2 \\ W_3 \end{bmatrix}.$$

If row vectors of W are provided to an array with the sequence of ($W_0$, $W_1$, $W_2$, $W_3$) (e.g., [0000,0000,0000, 0000], [1111,1111,1111,1111], [0000,0000,0000,0000], [1111,1111,1111,1111]) and outputs are saved to memory address at (0,1,2,3), then the number of bit flipping for each multiplier is 4 (0000→1111)+4 (1111→0000)+4 (0000→1111)=12 and the total number of multiplier bit flipping becomes 48. On the other hand, if row vectors of W are provided to an array with the sequence of ($W_0$, $W_2$, $W_1$, $W_3$) (e.g., [0000,0000,0000,0000], [0000,0000,0000,0000], [1111,1111,1111,1111], [1111,1111,1111,1111]) and outputs are saved to memory address at (0,2,1,3), then the same function can be achieved, but the number of bit flips for each multiplier circuit is 0 (0000→0000)+4 (0000→1111)+0 (1111→1111)=4, and the total number of multiplier bit flipping is 16, which is one third compared to computation based on the sequence of ($W_0$, $W_1$, $W_2$, $W_3$). Hence, energy consumption can be improved by rearranging or adjusting a sequence of weights applied to MAC circuitries.

Figure 4A:
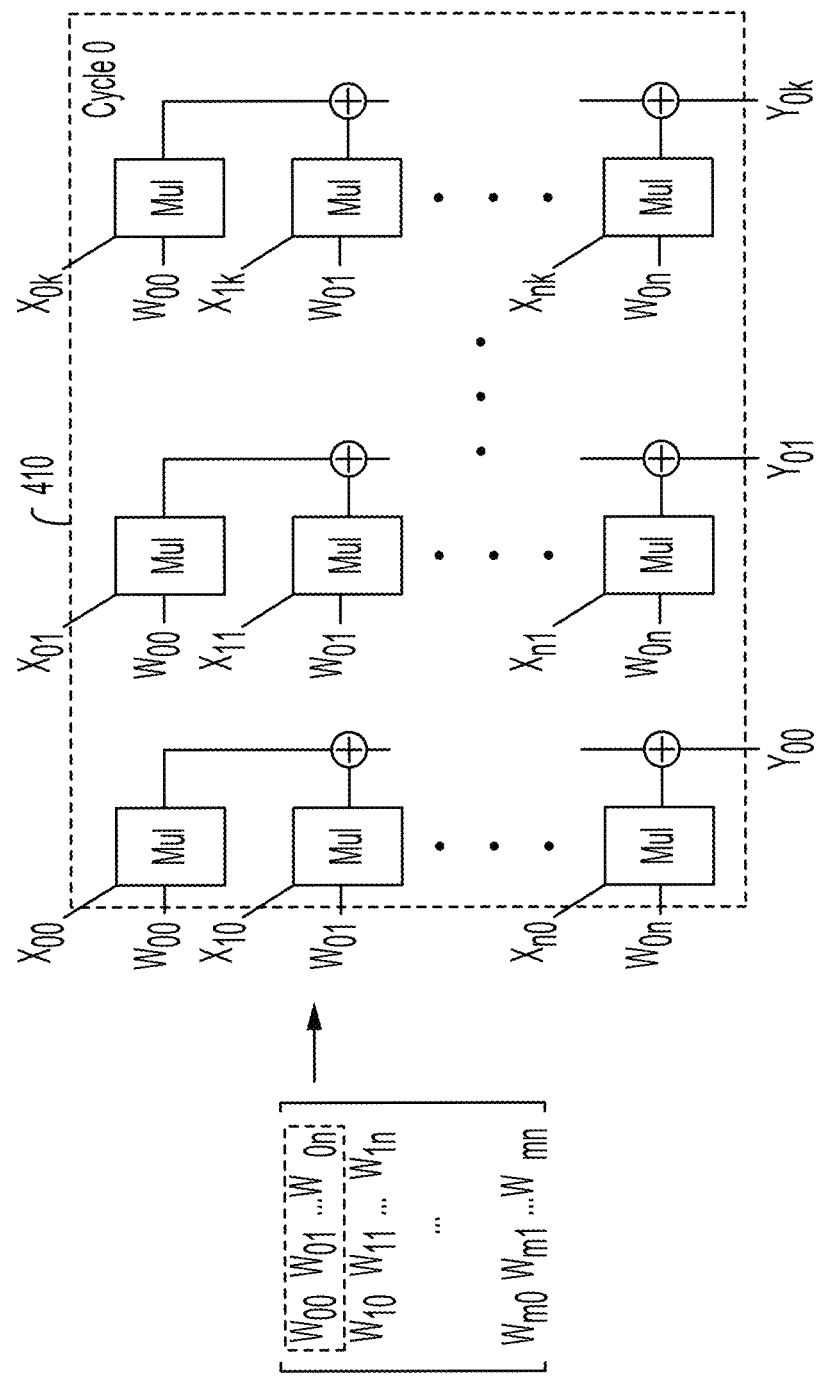
FIGS. 4A-4C show an example multiple column array for multiplying pre-filled inputs with a row of a weight matrix per cycle, according to an example implementation of the present disclosure.
Figure 4B:
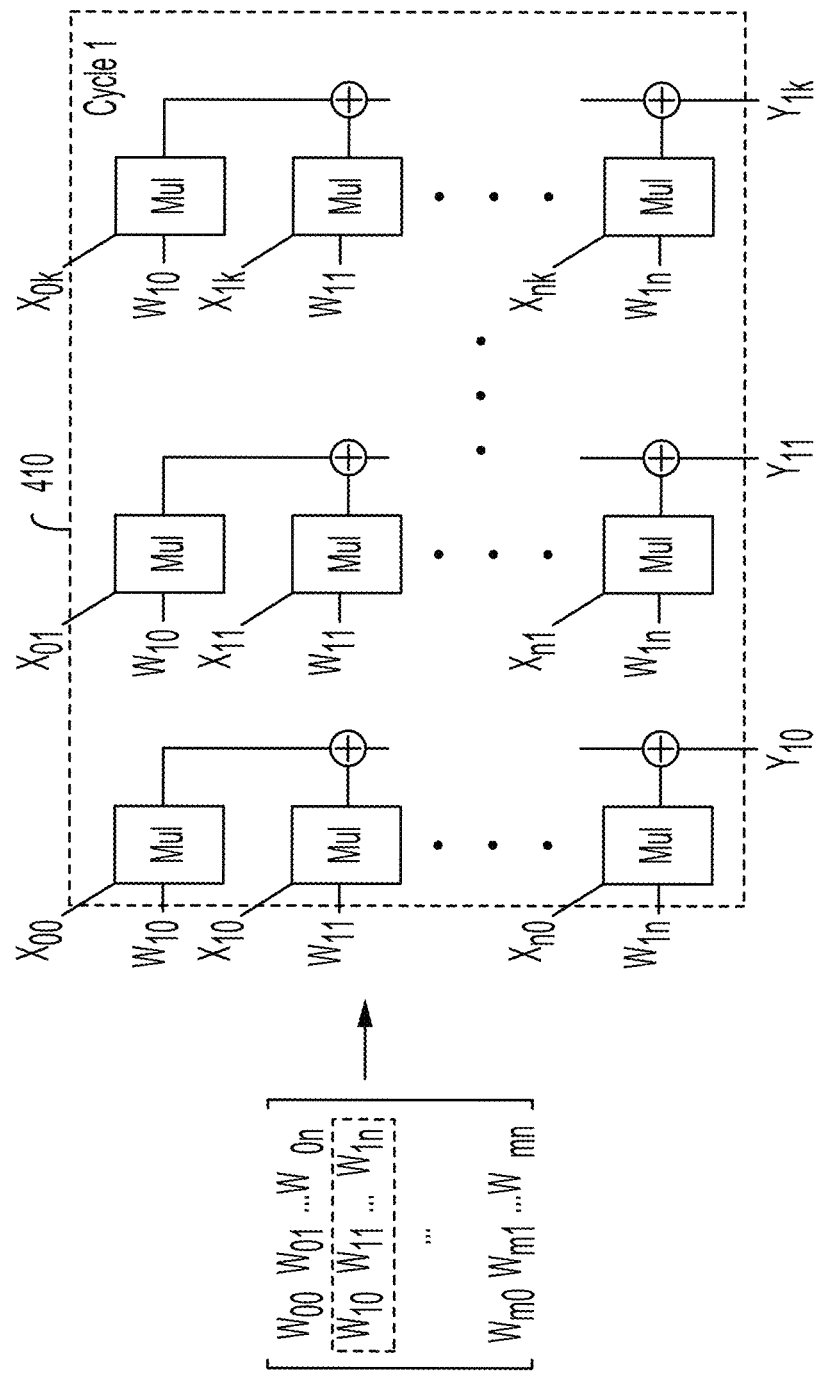
Figure 4C:
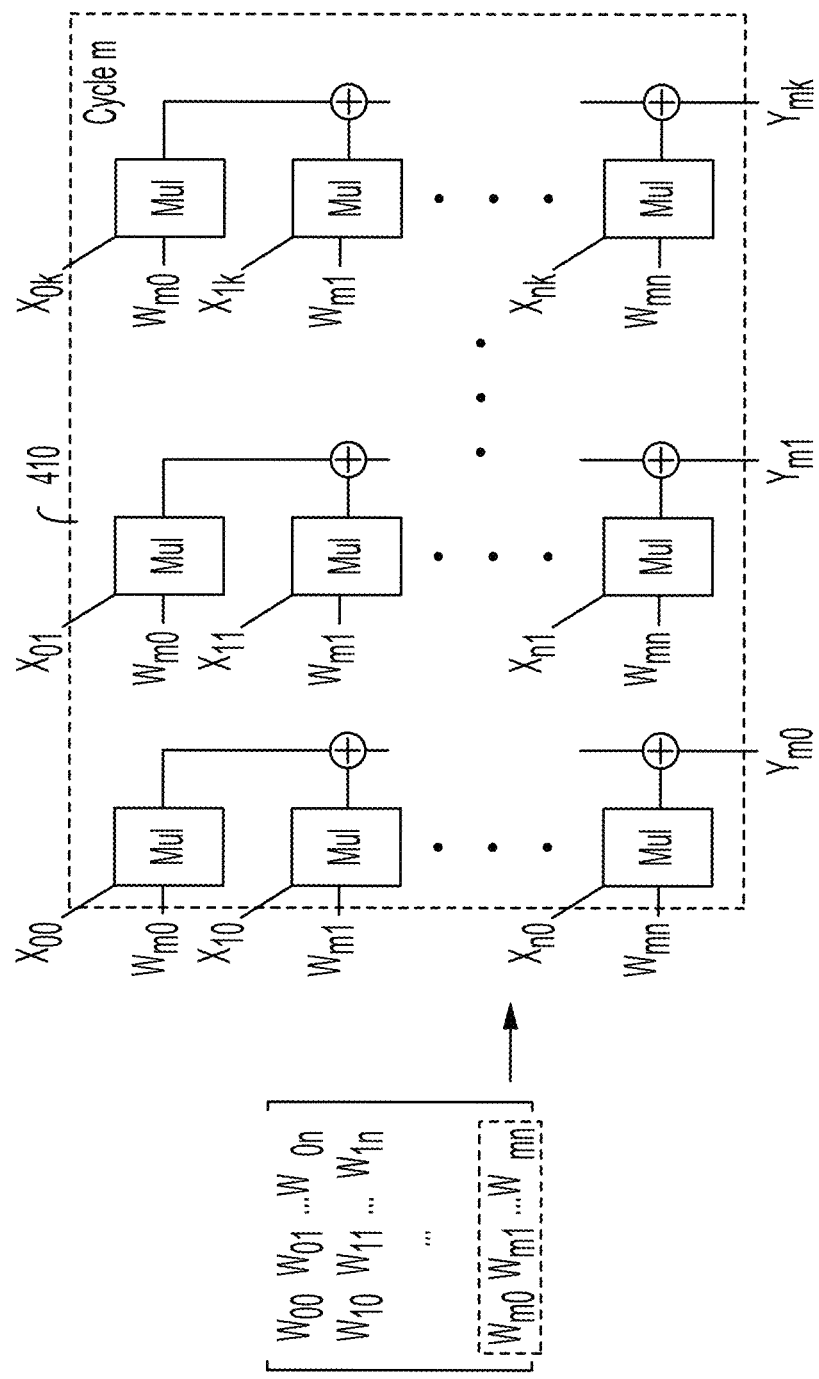

FIGS. 4A-4C show an example multiple column array for multiplying pre-filled inputs with a row of a weight matrix per cycle, according to an example implementation of the present disclosure. In one aspect, analyses or processes performed on a single column array can be applied to multi-column array. For example, MAC circuits 410 including k+1 by n+1 number of multiplier circuits and k+1 by n number of adder circuits is applied with input data $X_{00} \dots X_{kn}$ of the data vector, respectively. In one configuration, each multiplier circuit includes a first input and a second input, where the first input is applied with a corresponding input data X. The second input of the multiplier circuit may be applied with different weights during different clock cycles.

For example, as shown in FIG. 4A, during a clock cycle 0, weights $W_{00}$, $W_{01} \dots W_{0n}$ in a first row of the weight matrix W are applied to corresponding second inputs of the multiplier circuits, respectively. For example, a weight $W_{00}$ is applied to second inputs of the multiplier circuits in a first row of the MAC circuits 410 during the clock cycle 0. For example, a weight $W_{01}$ is applied to second inputs of the multiplier circuits in a second row of the MAC circuits 410 during the clock cycle 1. For example, a weight $W_{10}$ is applied to second inputs of the multiplier circuits in $n^{th}$ row of the MAC circuits 410 during the clock cycle 0.

For example, as shown in FIG. 4B, during a clock cycle 1, weights $W_{10}$, $W_{11} \dots W_{1n}$ in a second row of the weight matrix W are applied to corresponding second inputs of the multiplier circuits, respectively. For example, a weight $W_{10}$ is applied to second inputs of the multiplier circuits in a second row of the MAC circuits 410 during the clock cycle 1. For example, a weight $W_{11}$ is applied to second inputs of the multiplier circuits in a second row of the MAC circuits 410 during the clock cycle 1. For example, a weight $W_{1n}$ is applied to second inputs of the multiplier circuits in $n^{th}$ row of the MAC circuits 410 during the clock cycle 1.

For example, as shown in FIG. 4C, during a clock cycle m, weights $W_{10}, W_{11} \ldots W_{1n}$ in a second row of the weight matrix W are applied to corresponding second inputs of the multiplier circuits, respectively. For example, a weight $W_{m0}$ is applied to second inputs of the multiplier circuits in a second row of the MAC circuits 410 during the clock cycle m. For example, a weight $W_{m1}$ is applied to second inputs of the multiplier circuits in a second row of the MAC circuits 410 during the clock cycle m. For example, a weight $W_{mn}$ is applied to second inputs of the multiplier circuits in $n^{th}$ row of the MAC circuits 410 during the clock cycle m.

In one aspect, energy consumption can be reduced by rearranging or adjusting a sequence of weights applied to multiplier circuits of the MAC circuits 410. As described with respect to FIGS. 3A-3C, by applying weights of the weight matrix to the MAC circuits 410 with a sequence that renders or corresponds to a smaller total hamming distance, a number of bit flips can be reduced to achieve energy savings.

Figure 5:
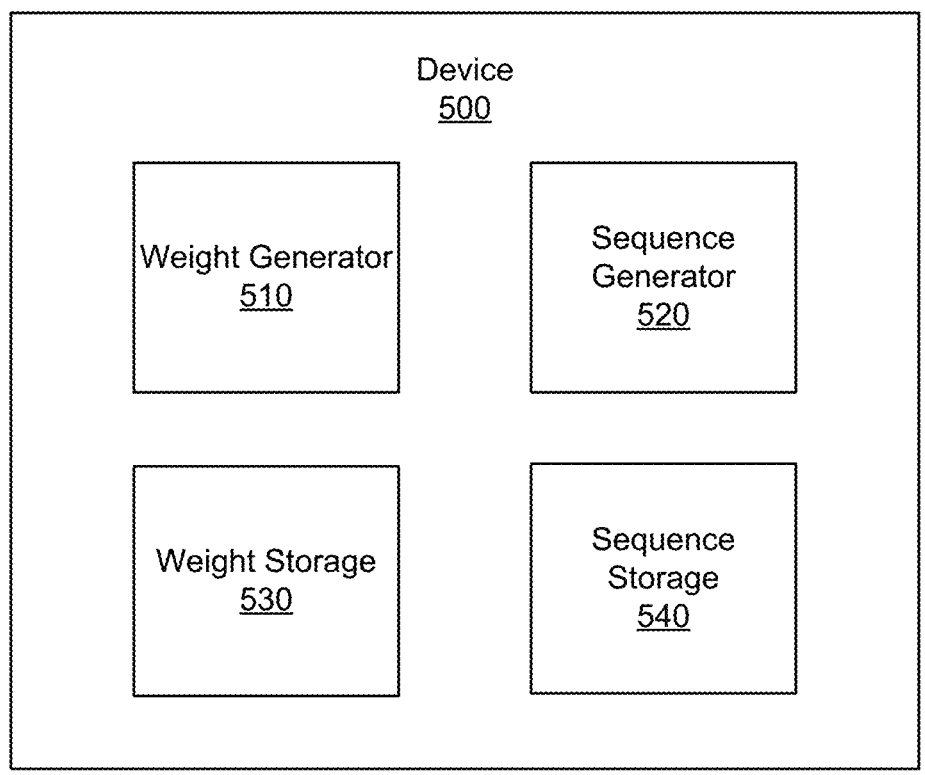
FIG. 5 shows an example diagram of a device that generates a weight matrix, and determines a sequence of applying weights for performing multiply-accumulate operations, according to an example implementation of the present disclosure.

Referring to FIG. 5, illustrated is a device 500 that generates weights for performing neural network computation. The device 500 may comprise any computing device (e.g., a computer, a mobile device, a head mounted display, etc.). In some embodiments, the device 500 includes a weight generator 510, a sequence generator 520, a weight storage 530, and/or a sequence storage 540. These components may operate together to generate a weight matrix, and determine a sequence of applying weights for performing multiply-accumulate operations. In some embodiments, the device 500 includes more, fewer, or different components than shown in FIG. 5. In some embodiments, the device 500 includes a processor and a non-transitory computer readable storing instructions when executed by the processor cause the processor to execute various operations described herein for generating weights and determining a sequence of weights applied for neural network computation. In some embodiments, the device 500 includes the AI accelerator 108. In some embodiments, some operations of the device 500 described can be performed by other entities, or in a distributed manner.

In some embodiments, the device 500 is implemented separately from another device implementing the AI accelerator 108. The device 500 may comprise a computing device, and the another device may comprise a mobile device (e.g., smart phone, tablet PC, or head mounted display). In this embodiments, the device 500 may train a neural network to generate or provide (or result in) a weight matrix including weights of the neural network, and may generate sequence data indicating a sequence of weights to be applied for neural network computation. The device 500 may provide the weights and the sequence data to the another device, which may perform neural network computation according to the weights and the sequence data. In one aspect, generating weights and determining a sequence of weights to be applied can be computationally exhaustive. In one aspect, the device 500 can generate weights and sequence data, such that the another device (e.g., console or mobile device) may omit exhaustive computation for generating weights and determining a sequence of weights to be applied such that energy consumption of the another device can be reduced.

In some embodiments, the device 500 includes the AI accelerator 108. In some embodiments, the device 500 may generate and/or update the weight matrix and the sequence data, when the device 500 (e.g., a console) has sufficient power, for example, when powered by a power outlet. The device 500 may perform neural network computation by applying weights to the AI accelerator 108 according to the sequence data, when the device 500 is operating based on a battery. Hence, energy consumption of the device 500 when operating based on the battery can be conserved, such that the operating time of the device 500 can be extended.

The weight generator 510 is or includes a component that generates a weight matrix including a set of weights. In one aspect, the weight generator 510 trains a neural network to determine weights of the neural network. For example, the neural network receives input data and a target output data, and generates an output data according to the input data received. Then, the weight generator 510 may compare the output data from the neural network and the target output data, and adjust or modify weights according to the comparison to reduce a difference between the output data and the target output data. Through training, based on a large number of samples (e.g., over thousand), the neural network may generate output data according to an input data that is close to a target output data. An example process of training or generating weights of a neural network is provided below with respect to FIG. 9. The weight generator 510 may store the weights using/in the weight storage 530.

The sequence generator 520 is or includes a component that determines a sequence of weights applied for neural network computation. In one aspect, the sequence generator 520 determines a sequence of weights applied to multiplier circuits. The sequence generator 520 may determine the sequence of weights to be applied according to THD. The sequence generator 520 may compute and/or compare hamming distances of rows of weights of the weight matrix, and determine a sequence to reduce or minimize the hamming distances of the row of weights. The sequence generator 520 may generate and store sequence data indicating a sequence of weights to be applied or neural network computation by the sequence storage 540. In some embodiments, the sequence generator 520 receives the weight matrix including weights from the weight generator 510, and determines a sequence of/for the weights to be applied. In some embodiments, the sequence generator 520 receives one or more bits of weights of the weight matrix from the weight generator 510, and determines a sequence of/for the weights to be applied. Then, the weight generator 510 may tune, determine, or adjust one or more subsequent bits of the weights.

Figure 6:
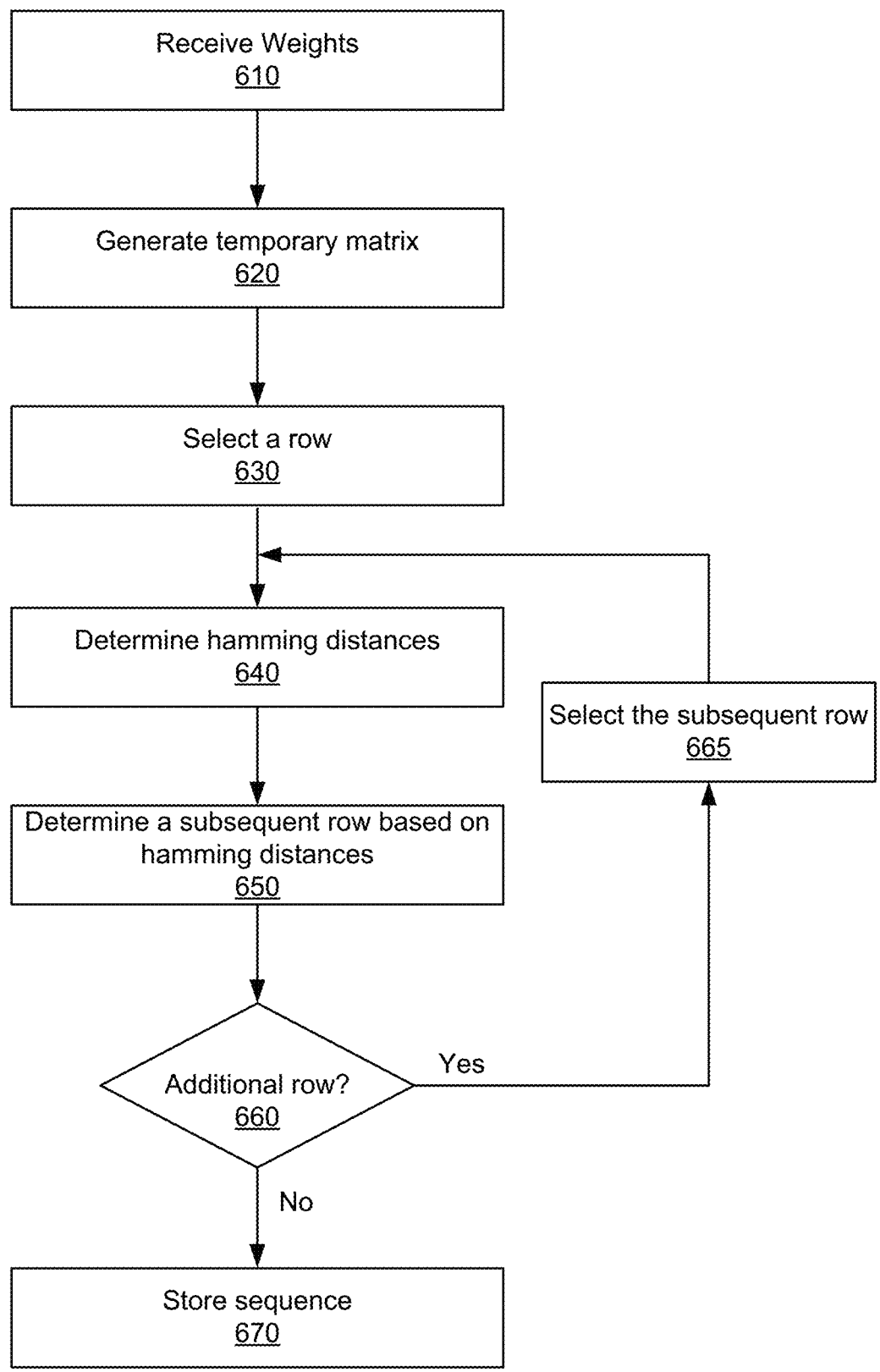
FIG. 6 shows an example process of determining a sequence of weights applied for neural network computation, according to an example implementation of the present disclosure.

In one approach, a sequence Sb with smallest THD(Sb) can be identified by a Traveling Salesperson Problem (TSP). In one aspect, each $A_i$ in A may be one location to visit, Hamming distance $H(A_j, A_k)$ may be the distance between two locations, and a sequence to visit those locations with the minimal THD can be determined. However, an exhaustive search algorithm for size n has time complexity of O(n!), and may not be feasible in some cases. In some embodiments, greedy search can obtain acceptable results on TSP. An example pseudo code for naive greedy search is provided below:

input: A is input list with length N
output: S is sequence with minimum THD
S[0]=A[0]
remove A[0] from A
for I in 1 . . . (N−1):
    j=argmin(HS(S[i−1], A[j]))
    S[i]=A[j]
    remove A[j] from A FIG. 6 shows an example process 600 of determining a sequence of weights to apply for neural network computation, according to an example implementation of the present disclosure. In some embodiments, the process 600 is performed by the sequence generator 520. In some embodiments, the process 600 is performed by other entities. In some embodiments, the process 600 includes more, fewer, or different steps than shown in FIG. 6.

In one approach, the sequence generator 520 receives 610 weights of a weight matrix. The sequence generator 520 may receive the weights from the weight generator 510 or from the weight storage 530. In one approach, the sequence generator 520 generates 620 a temporary matrix including weights of the weight matrix. For example, the sequence generator 520 may generate the temporary matrix A having weights (or elements) initially identical to those of the received weight matrix.

In one approach, the sequence generator 520 selects 630 weights in a row of the temporary matrix. The sequence generator 520 may select a predetermined row of the temporary matrix. The sequence generator 520 may remove the selected row from the temporary matrix. In one approach, the sequence generator 520 determines 640 hamming distances of weights in remaining rows of the temporary matrix with respect to the weights in the selected row. The sequence generator 520 may determine, for each remaining row, a hamming distance with respect to the selected row. In one approach, the sequence generator 520 determines 650 a subsequent row to follow the selected row, according to the hamming distances. In response to determining the subsequent row, the sequence generator 520 may remove the determined subsequent row from the temporary matrix. In one approach, the sequence generator 520 determines 660 whether an additional row exists in the temporary matrix. In response to determining that an additional row exists, the sequence generator 520 may select 665 the subsequent row as the selected row, and proceed to the step 640. In response to determining that no additional row exists, the sequence generator 520 may conclude and store 670 the sequence.

Assuming for example that the temporary matrix A includes four rows [$A_0$, $A_1$, $A_2$, $A_3$], the sequence generator 520 may select a first row $A_0$. The sequence generator 520 may remove the selected row $A_0$ from the temporary matrix A. The sequence generator 520 may determine, for each remaining row, a hamming distance with respect to the selected row $A_0$. For example, the sequence generator 520 determines or counts, for each of the remaining rows (e.g., $A_1$, $A_2$, $A_3$), a number of different bits between the selected row. The sequence generator 520 may determine a row (e.g., $A_3$) having a smallest hamming distance or a smallest number of different bits as a subsequent row to follow the selected row $A_0$. The sequence generator 520 may remove the determined subsequent row from the temporary matrix A. The sequence generator 520 may select the subsequent row (e.g., $A_3$), and determine a next subsequent row (e.g., $A_2$ or $A_4$) to follow the subsequent row (e.g., $A_3$) through the similar process.

In one aspect, the sequence generator 520 segments, partitions or divides the weight matrix to improve efficiency of determining a sequence of weights applied for neural network computation. In one aspect, the benefit obtained from the sequence tuning may depend on the size n of the input list (or a number of rows of the weight matrix), and the length l of each bit string of the row. With larger n and smaller l, the efficiency of the sequence tuning can be improved. In one example, for a pointwise convolution layer with convolution kernel size of 1×1, input channel size of 32 and output channel size of 192, the weight matrix W has 192 rows and 32 columns, and can be represented as W[0:191][0:31]. One row of W with 32 elements may be applied to the MAC circuits for matrix multiplication. In case the MAC circuit has eight multiplier circuits in one column, the MAC circuit may not accommodate 32 elements or weights of a full row from the weight matrix W. In one approach, the sequence generator 520 may segment the weight matrix W (also referred to as "a base matrix") into multiple sub-matrices and determine, for each sub-matrix, a corresponding sequence of weights to be applied for the neural network computation. For example, the weight matrix W can be segmented into four sub-matrices, with W0=W[0:191][0:7], W1=W[0:191][8:15], W2=W[0:191][16:23], W3=W[0:191][24:31]. The sequence generator 320 may determine a number n of rows of the weight matrix and/or length l of each bit string of the row, and segment the weight matrix W, according to the number n of rows of the weight matrix and/or length l of each bit string of the row. For example, the sequence generator 320 may segment the weight matrix W, in response to determining that the number n of rows of the weight matrix is larger than a predetermined threshold (e.g., 4 or more). For example, the sequence generator 320 may segment the weight matrix W, in response to determining that the length l of each bit string of the row is larger than a predetermined threshold (e.g., 16 bits or 32 bits). By segmenting the weight matrix, total harmonic distance can be improved by at least 1.5-2.7 times.

Figure 7A:
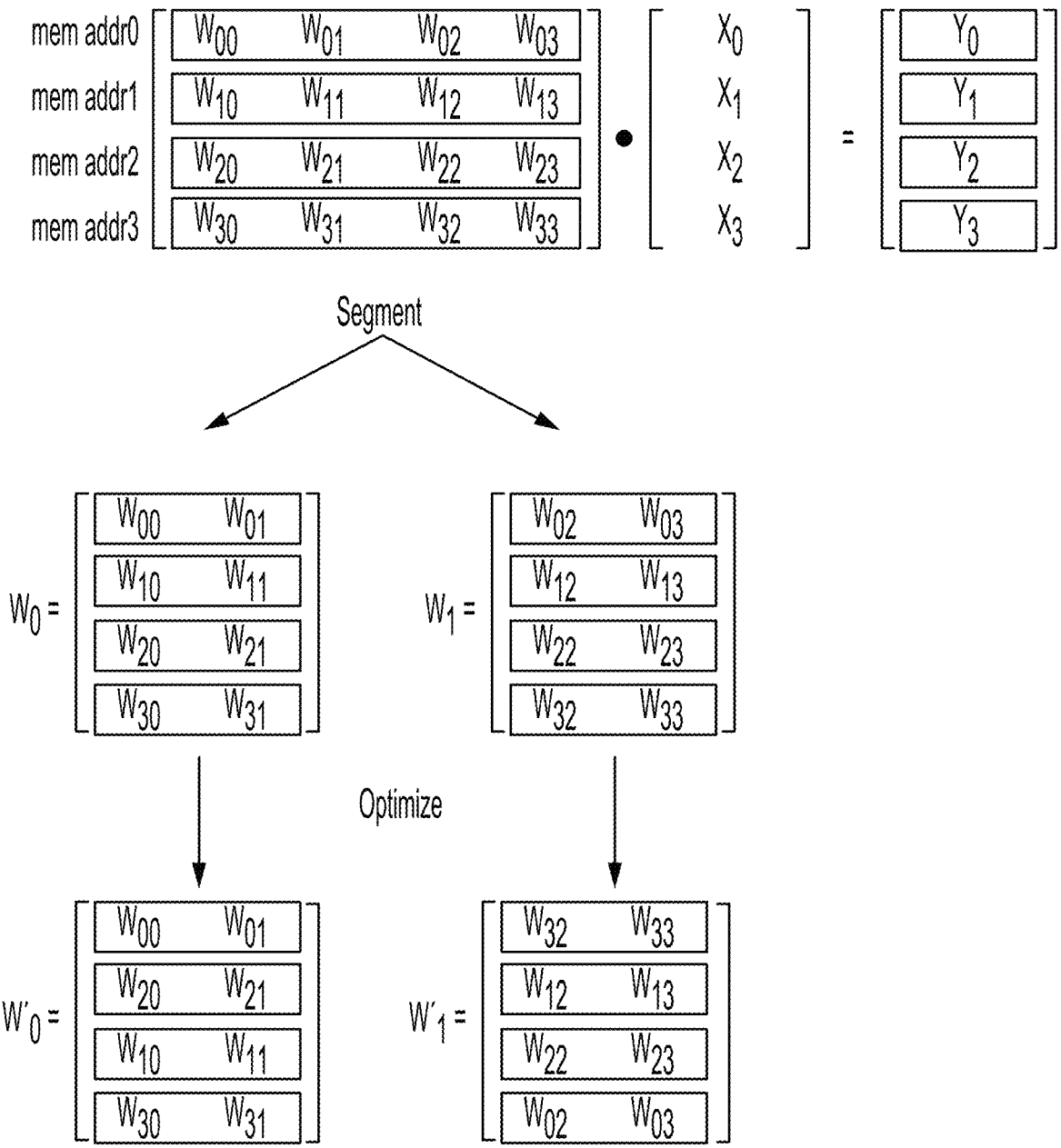
FIGS. 7A-7C show an example diagram for a segment-then-optimize scheme, according to an example implementation of the present disclosure.
Figure 7B:
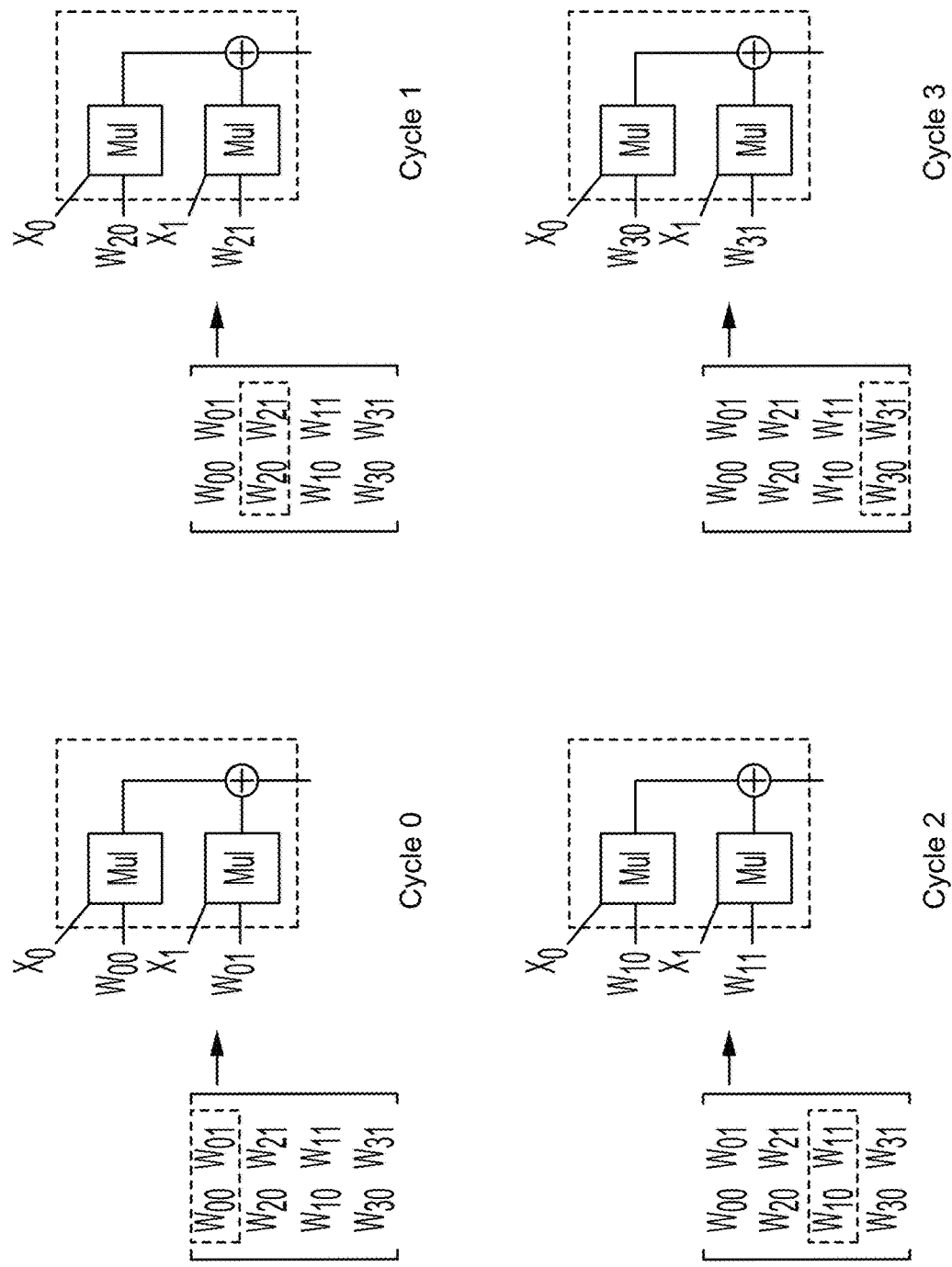
Figure 7C:
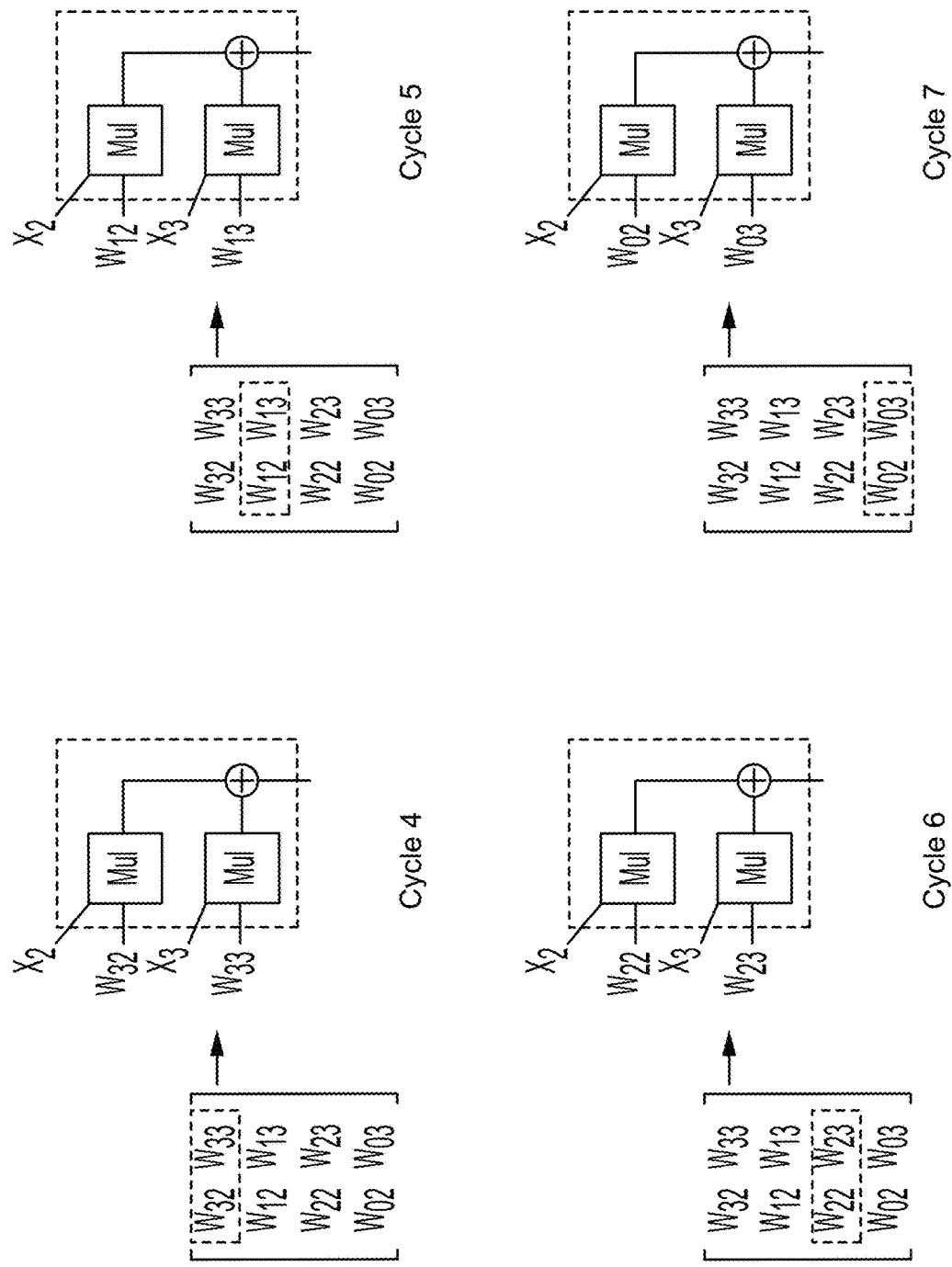

FIGS. 7A-7C show an example diagram for segment-then-optimize scheme, according to an example implementation of the present disclosure. In one example, the sequence generator 520 generates an accumulation sequence indicating associations between MAC operations. In one aspect, the accumulation sequence indicates a storage address to store results of MAC operations. The sequence generator 520 may store the accumulation sequence by the sequence storage 540 or a separate storage. The AI accelerator 108 may receive the accumulation sequence, and accumulate or add multiplication results, according to the accumulation sequence.

As an illustrative example, assume W is a 4×4 matrix and the following matrix-vector multiplication can be performed:

$$\begin{bmatrix} W_{00} & W_{01} & W_{02} & W_{03} \\ W_{10} & W_{11} & W_{12} & W_{13} \\ W_{20} & W_{21} & W_{22} & W_{23} \\ W_{30} & W_{31} & W_{32} & W_{33} \end{bmatrix} \begin{bmatrix} X_0 \\ X_1 \\ X_2 \\ X_3 \end{bmatrix} = \begin{bmatrix} Y_0 \\ Y_1 \\ Y_2 \\ Y_3 \end{bmatrix}.$$

In one aspect, the memory layout for the output result Y is $Y_0$ in memory address 0, $Y_1$ in address 1, $Y_2$ in address 2, and $Y_3$ in address 3. Therefore, W has the first row [$W_{00}$, $W_{01}$, $W_{02}$, $W_{03}$] correspond to Y0 at memory address 0, the second row [$W_{10}$, $W_{11}$, $W_{12}$, $W_{13}$] correspond to $Y_1$ at memory address 1, the third row [$W_{20}$, $W_{21}$, $W_{22}$, $W_{23}$] correspond to $Y_2$ at memory address 2, and the fourth row [$W_{30}$, $W_{31}$, $W_{32}$, $W_{33}$] correspond to $Y_3$ at memory address 3. Further, assume that the weight matrix W can be segmented into two sub-matrices $W_0$ and $W_1$:

$$W_0 = \begin{bmatrix} W_{00} & W_{01} \\ W_{10} & W_{11} \\ W_{20} & W_{21} \\ W_{30} & W_{31} \end{bmatrix}, W_1 = \begin{bmatrix} W_{02} & W_{03} \\ W_{12} & W_{13} \\ W_{22} & W_{23} \\ W_{32} & W_{33} \end{bmatrix}.$$

For the first sub-matrix $W_0$, the first row [$W_{00}$, $W_{01}$] corresponds to a partial sum of $Y_0$ at memory address 0, second row [$W_{10}$, $W_{11}$] corresponds to a partial sum of $Y_1$ at memory address 1, the third row [$W_{20}$, $W_{21}$] corresponds to a partial sum of $Y_2$ at memory address 2, and the fourth row [$W_{30}$, $W_{31}$] corresponds to a partial sum of $Y_3$ at memory address 3. For the second sub-matrix $W_1$, the first row [$W_{02}$, $W_{03}$] corresponds to a partial sum of $Y_0$ at memory address 0, second row [$W_{12}$, $W_{13}$] corresponds to a partial sum of $Y_1$ at memory address 1, the third row [$W_{22}$, $W_{23}$] corresponds to a partial sum of $Y_2$ at memory address 2, and the fourth row [$W_{32}$, $W_{33}$] corresponds to partial sum of $Y_3$ at memory address 3.

Further assume for example that the sequence generator 520 rearranges or adjusts a sequence of weights applied for MAC operation, as follows:

$$W'_0 = \begin{bmatrix} W_{00} & W_{01} \\ W_{20} & W_{21} \\ W_{10} & W_{11} \\ W_{30} & W_{31} \end{bmatrix}, W'_1 = \begin{bmatrix} W_{32} & W_{33} \\ W_{12} & W_{13} \\ W_{22} & W_{23} \\ W_{02} & W_{03} \end{bmatrix}.$$

In this example, for the adjusted sub-matrix $W'_0$, the first row [$W_{00}$, $W_{01}$] may correspond to a partial sum of $Y_0$ at memory address 0, the second row [$W_{20}$, $W_{21}$] may correspond to a partial sum of $Y_2$ at memory address 2, the third row [$W_{10}$, $W_{11}$] may correspond to a partial sum of $Y_1$ at memory address 1, and the fourth row [$W_{30}$, $W_{31}$] may correspond to a partial sum of $Y_3$ at memory address 3. In this example, for the adjusted sub-matrix $W'_1$, the first row [$W_{32}$, $W_{33}$] may correspond to a partial sum of $Y_3$ at memory address 3, the second row [$W_{12}$, $W_{13}$] may correspond to a partial sum of $Y_1$ at memory address 1, the third row [$W_{22}$, $W_{23}$] may correspond to a partial sum of $Y_2$ at memory address 2, and the fourth row [$W_{02}$, $W_{03}$] may correspond to a partial sum of $Y_0$ at memory address 0. Therefore, results of MAC operations can be stored at corresponding memory address as indicated by the accumulation sequence, such that MAC operations of the sub-matrix $W'_0$ can be accumulated or added with corresponding MAC operations of the sub-matrix $W'_1$.

In one aspect, a sequence size n may not be limited by output memory depth. In one example, where each optimized sub-matrix $W'_0$, $W'_1$, $W'_2$ and $W'_3$ has 192 rows. For an output memory depth of 64, for example, $W'_0$, $W'_1$, $W'_2$ and $W'_3$ may be sent in an interleaving manner. In other words, instead of directly sending $W'_0[0:191][0:7]$ then $W'_1[0:191][8:15]$ then $W'_2[0:191][16:23]$ then $W'_3[0:191][24:31]$, do output buffer write out, data may be sent in the following sequence of $W'_0[0:63][0:7]$, $W'_1[0:63][0:7]$, $W'_2[0:63][0:7]$, $W'_3[0:63][0:7]$, (do memory write out), $W'_0[64:127][0:7]$, $W'_1[64:127][0:7]$, $W'_2[64:127][0:7]$, $W'_3[64:127][0:7]$, (do memory write out), $W'_0[128:191][0:7]$, $W'_1[128:191][0:7]$, $W'_2[128:191][0:7]$, $W'_3[128:191][0:7]$, (do memory write out). This may have minimal impact on THD improvement. Comparing two cases, extra bit flipping happens when different sub-matrices are switched; e.g., $W'_0[63][0:7] \rightarrow W'_1[0][0:7]$, $W'_1[63][0:7] \rightarrow W'_2[0][0:7]$, $W'_2[63][0:7] \rightarrow W'_3[0][0:7]$, $W'_3[63][0:7] \rightarrow W'_0[64][0:7]$, $W'_0[127][0:7] \rightarrow W'_1[64][0:7]$, $W'_1[127][0:7] \rightarrow W'_2[64][0:7]$, $W'_2[127][0:7] \rightarrow W'_3[64][0:7]$, $W'_3[127][0:7] \rightarrow W'_0[128][0:7]$, $W'_0[191][0:7] \rightarrow W'_1[128][0:7]$, $W'_0[191][0:7] \rightarrow W'_1[128][0:7]$, $W'_1[191][0:7] \rightarrow W'_2[128][0:7]$, $W'_2[191][0:7] \rightarrow W'_3[128][0:7]$. With an output buffer depth of d, the extra bit flipping may happen once after sending a sequence length of d, and the Hamming Distance overhead can be 1/d. For a reasonable d (e.g., 64 or 128), this overhead may be less than 2%.

Figure 8A:
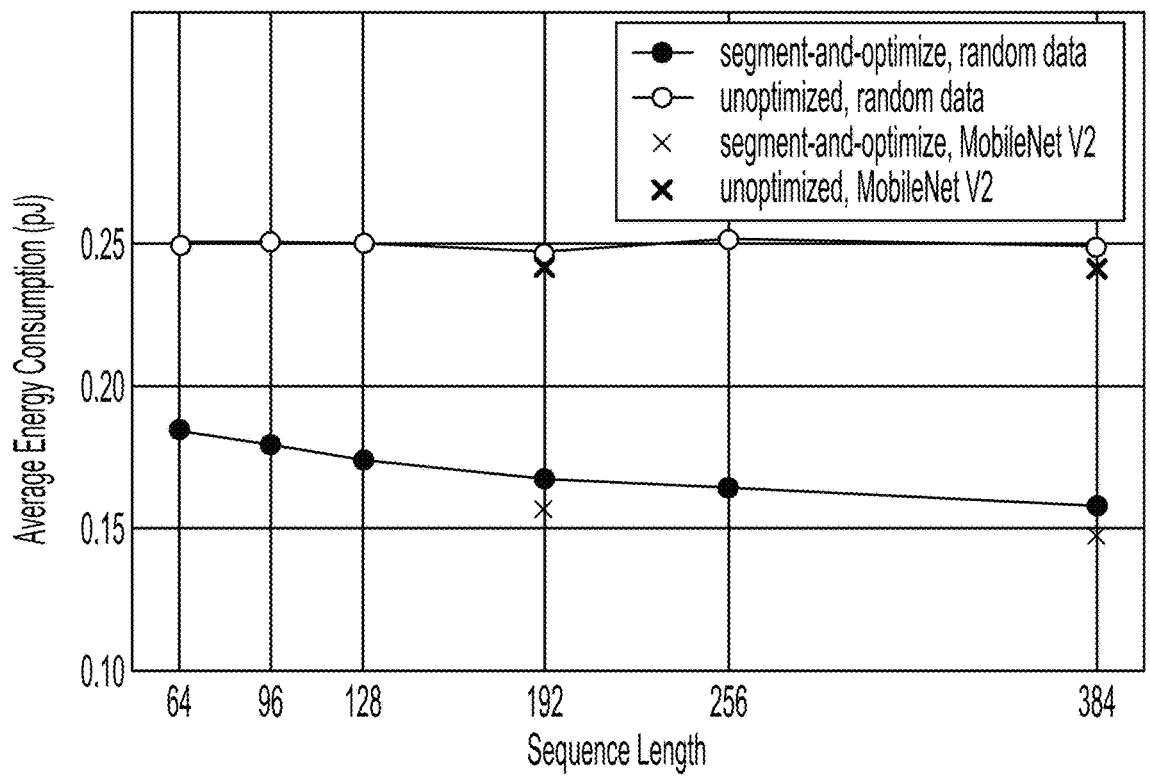
FIGS. 8A and 8B show an average energy consumption of array and total hamming distance ratio between a non-optimized sequence and a segment-and-optimize sequence with various sequence length, according to an example implementation of the present disclosure.
Figure 8B:
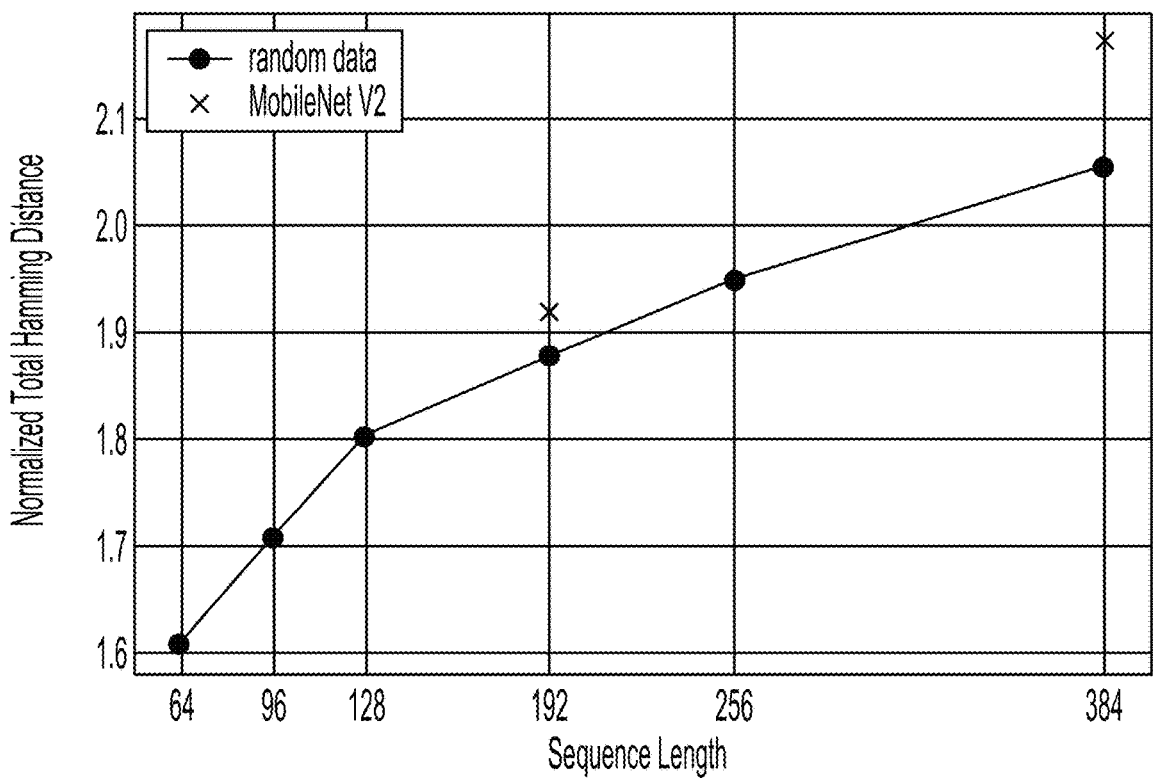

FIGS. 8A and 8B show an average energy consumption of array and total hamming distance ratio between a non-optimized sequence and a segment-and-optimize sequence with various sequence length, according to an example implementation of the present disclosure. To evaluate the effect of Hamming distance optimization, a MAC array with 8 rows and 2 columns is implemented, for example. As shown in FIG. 8A, each cell in array can natively support 8-bit×4-bit multiplication, where 8-bit is for CNN model input activation (X) and 4-bit is for model weight parameter (W). The array may be synthesized using a synthesis tool (e.g., Design Compiler) and place & route performed using a physical implementation tool (e.g., IC Compiler II) with 7 nm technology, and can meet 1 GHz timing constraint. The cycle-accurate post layout power is extracted, and converted into energy by multiplying clock period (1 ns).

Assuming input-stationary operation of the array: input activation can be pre-loaded into the array, and then one row of weight submatrix can be sent into array each cycle. Experimentation is performed with multiple weight parameter matrix cases: original sequence, optimized sequence with segment-then-optimize (segment length 1 of bit string=8*4 bit=32 bit), worst case sequence, and report average energy consumption for three cases. Since preloaded input activation data also has an effect on energy (for example, if the pre-loaded activation data is 0 then the multiplier energy is the same regardless of weight sequence), the average energy over all possible activation cases is reported. In one aspect, with one weight input sequence, 8-bit preloaded activation data is first set as 1, the weight sequence is performed, then preloaded activation data is changed to 2, the weight sequence is performed again, until all possible preloaded activations (255 possibilities in total) are exhausted, and average energy is reported. Leakage energy is two-orders of magnitude smaller and is ignored here.

The average energy for typical layers of MobileNet V2 (quantized to 4-bit) is shown below. It can be seen that for typical pointwise layers in MobileNet V2 (occupies 95% computation load of the total network), 1.8 times energy improvement can be achieved for extreme case and 1.5-1.6 times energy improvement can be achieved for average case.

|  | combinational logic energy per cycle, pJ | register logic energy per cycle, pJ | datapath energy per cycle, (comb + reg), pJ | normalized datapath energy | total Hamming Distance | normalized total Hamming Distance |
|---|---|---|---|---|---|---|
| segment-then-optimize | 0.133 | 0.0238 | 0.156 | 1 | 5536 | 1 |
| unoptimized | 0.200 | 0.0410 | 0.241 | 1.55 | 11145 | 2.013 |
| worst case | 0.224 | 0.0484 | 0.272 | 1.74 | 13646 | 2.465 |

Layer 18: weight kernel size if 1×1, 32 input channels, 192 output channels

| | combinational logic energy per cycle, pJ | register logic energy per cycle, pJ | datapath energy per cycle (comb + reg), pJ | normalized datapath energy | total Hamming Distance | normalized total Hamming Distance |
|---|---|---|---|---|---|---|
| segment-then-optimize | 0.125 | 0.0217 | 0.147 | 1 | 20677 | 1 |
| Unoptimized | 0.200 | 0.0402 | 0.240 | 1.64 | 44876 | 2.170 |
| worst case | 0.219 | 0.0462 | 0.265 | 1.8 | 52827 | 2.554 |

Layer 27: weight kernel size if 1×1, 64 input channels, 384 output channels

In order to evaluate the general effect of Hamming Distance optimization, random bit string is tested. For each sequence size n, an n×8 matrix is generated, each entry in the matrix is a 4-bit random integer ranging from −8~7 with the same distribution as in typical quantized parameter of deep learning models. Each row of the matrix concatenated into a bit string with length l of 32 (8*4 bit=32 bit), and bit string sequence of the random matrix is sent (one row each time) into array. The average energy for optimized and non-optimized sequence is reported below with various n (64, 96,128,192, 256, 384). Experiments are repeated for each n 8 times with different random seeds to average out random noise. The datapath energy of array and total Hamming distance ratio between non-optimized sequence and sequence after segment-and-optimize is shown in FIG. 8A. The segment-then-optimize sequence can achieve 1.35-1.53 times improvement in energy for various l, which suggests this method can benefit various layer shapes. MobileNet V2 data point is annotated on the same figure, and random data and MobileNet V2 data may correlate well. It can be seen that as sequence length becomes longer, the average energy for non-optimized sequence stays almost unchanged, however with the longer sequence there is more opportunity for optimization and the average energy for segment-and-optimize sequence keeps going down.

In this work, a method to improve computation array data path energy by optimizing total Hamming Distance of input sequence is proposed. By using simple greedy search algorithm, optimized input sequence with reduced total Hamming distance can be found. With segment-and-optimize trick, great total Hamming Distance reduction can be achieved even with long bit string, while the related hardware overhead is very small. Experiment suggests that when accelerating quantized MobileNet V2 network, up to 1.8 times average energy can be saved.

In some embodiments, this method may be applicable to weight stationary array. In weight stationary array, input sequence may not be known in advance, but correlation statistics between inputs may be available. For example, for CV applications, nearby pixels may have higher correlation and by putting those highly-correlated pixels next to each other in input sequence may reduce total Hamming distance and thus reduce total energy.

In one aspect Hamming Distance aware training can be performed. Hamming Distance related regularization term can be added during training and obtain a model with intrinsically low THD.

As discussed above, by tuning the sequence of input, total Hamming distance can be optimized and thus energy consumption can be optimized. Formally, for an input list of $A=\{A1, A2, \ldots, An\}$ with size n, where each element $Ai$ is a bit string of length l, A is then fed into hardware with sequence $S=(As1, As2, \ldots, Asn)$ where $si \in [1, n]$ and $sj \cdot sk$ if $j \neq k$. This way, all elements of A can be fed into hardware only once.

In one aspect, given size n of A and length l of each element, the total Hamming distance ratio between best sequence Sb and (average) unsorted sequence Sw, e.g., $THD\_R(A)=THD(Sw)/THD(Su)$ can be estimated. In general, larger n and smaller 1 likely increase the benefit of Hamming distance optimization. Mathematically, a bit string with length l has state space with $2^l$/possible states in 1-D space. For list A composed of those $2^l$/states, Sb and Sw with $THD\_R1=THD(Sw)/THD(Su)$ can be analytically found or determined.

The relationship between THD_R1 and actual THD_R(A) can be identified as followed. In one aspect, list A with length of n may be a random sampling from those $2^l$/possible states. If n is small, there is more chance of sampling a list where elements have similar Hamming distance with each other, so that there is less benefit in tuning sequence. For example, with l=3 and n=3 (e.g., is much smaller n than $2^l$/=8), A may be {001,010,100} and {110,101,011}, may have the same total Hamming distance regardless of tuning sequence. On the other hand, if n is large enough that there is higher probability of sampling more states in state space, then at least THD_R1, or even better can be achieved (since one state can be sampled more than once—in fine tuning, same bit string can be placed next to each other to make Hamming Distance equal to 0). For an extreme case A with l=1 and n=4, each bit string is just a single bit 0 or 1. In this case, the optimal total Hamming distance is 1 regardless of n (if both 0 and 1 appears in A), since 0's can be placed together and 1's can be placed together (e.g., (0,0,1,1)). FIG. 8B shows a relationship between the sequence length and the normalized total hamming distance.

C. Methods and Devices for Training a Neural Network to Reduce Total Hamming Distance In some embodiments, the device 500 generates the weight matrix with an adjusted sequence of weights. For example, the weight generator 510 generates or determines one or more bits of weights, and the sequence generator 520 may determine or adjust a sequence of weight to be applied for MAC operation in an iterative approach. In one aspect, the device 500 employs iterative freeze-and-regularize procedure. In the neural network training process, regularization can be added to the most significant bit and after several epochs, the most significant bit can be fixed. Then, the second most significant bit can be regularized. The iterative process may continue until all the bits of the model are fixed.

In one aspect, the optimal sequence of output channels s of $\mathcal{L}_{THD}$ is unknown and can change in the training process. For a given weight matrix, searching for the optimal sequence of output channels s can be formulated as a traveling salesman problem, which can be solved approximately with a greedy algorithm. Meanwhile, although s may change as the weights get updated after each batch in the training, s can be updated only after each epoch to reduce the training time, in some embodiments.

Next, the THD loss of the network parameters can be incorporated into the normal loss function by multiplying a scaling factor ($\lambda_2 > 0$), which controls the trade-off between accuracy and the bit flip probability. In one aspect, the final loss function is given as:

$$\mathcal{L} = \mathcal{L}_{CE} + \lambda_1 \sum_{i=0}^{d} \|\omega_i\|_2^2 + \lambda_2 \sum_{i=0}^{d} \mathcal{L}_{HD}(\omega_i)$$

where $\mathcal{L}_{CE}$ represents the original cross-entropy loss in the classification problem, and $$\|\omega_i\|_2^2$$

denotes the weight decay regularization.

Figure 9:
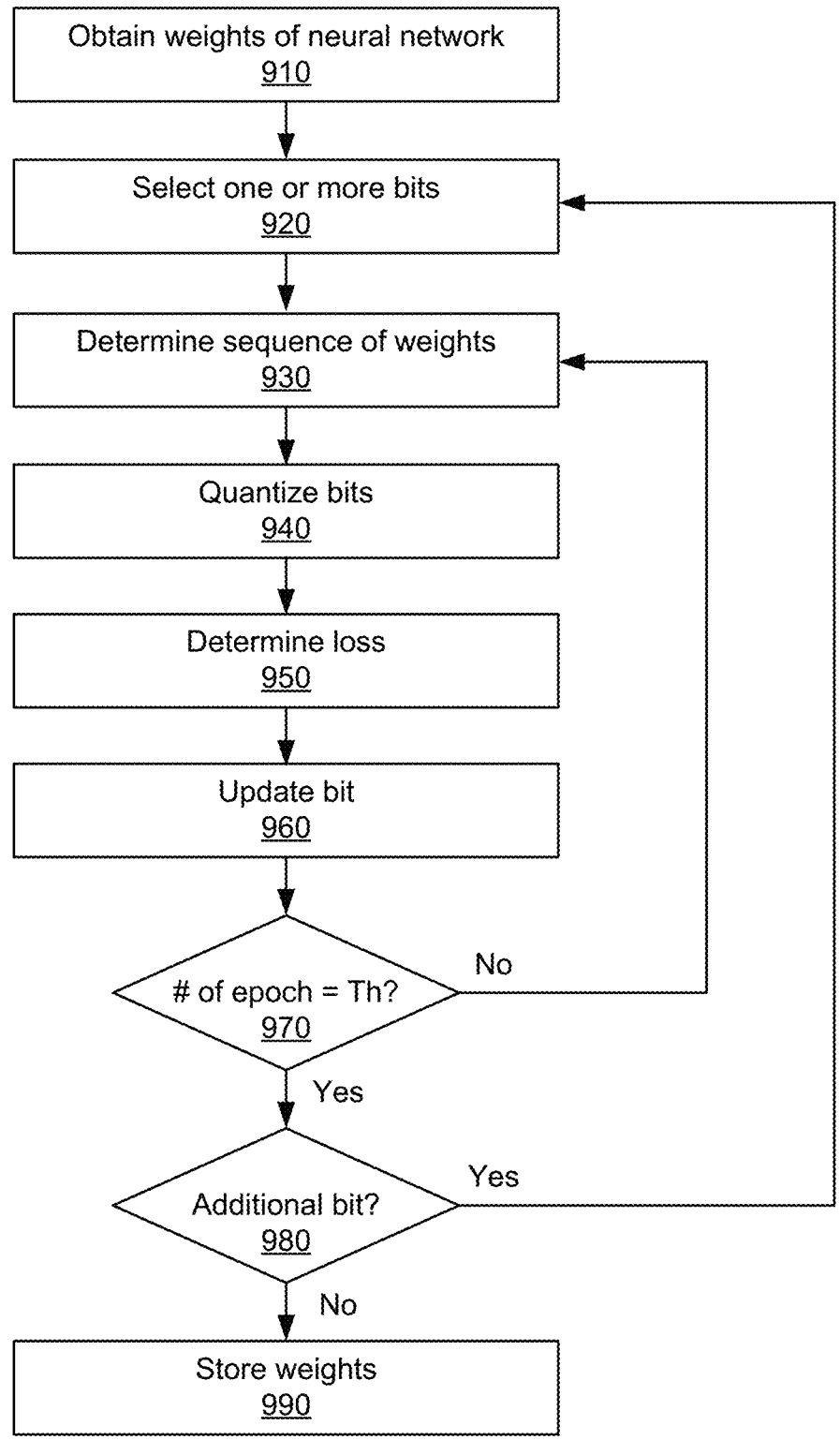
FIG. 9 shows an example process of training a neural network, according to an example implementation of the present disclosure.

FIG. 9 shows an example process 900 of training a neural network, according to an example implementation of the present disclosure. The process 900 may be performed by the device 500. In some embodiments, the process 900 is performed by other entities. In some embodiments, the process 900 includes more, fewer, or different steps than shown in FIG. 9.

In one approach, the device 500 obtains 910 weights of neural network. The weights of neural network may be predetermined. In one approach, the device 500 selects 920 one or more bits of weights of the neural network. The device 500 may select one or more most significant bits of the weights.

In one approach, the device 500 determines a sequence of weights. For example, the device 500 determines a sequence of rows of the weight matrix. The device 500 may segment the weight matrix, and determine, for each sub-matrix, a corresponding sequence of rows, as described above with respect to FIGS. 7A-7C. In one approach, the device 500 quantizes 940 the weights, and determines 950 a loss of the function $\mathcal{L}$. The device 500 may update 960 the selected one or more bits according to the determined loss. For example, the device 500 adjusts, updates, or modifies the selected one or more bits, in response to the determined loss being larger than a predetermined threshold. The device 500 may bypass adjusting, updating, or modifying the selected one or more bits, in response to the determined loss being less than the predetermined threshold. After updating the one or more bits, the device 500 may increase an epoch count, for example, by one.

In one approach, the device 500 determines 970 whether the epoch count has reached a threshold number. In response to the epoch count being less than the threshold number, the device 500 may proceed to the step 930, and can determine or adjust a sequence of rows of the weight matrix.

In one approach, the device 500 determines 980 whether additional bits of weights should be determined. If additional bits of weights should be determined, the device 500 may proceed to the step 920, and can select subsequent one or more bits of the weights. For example, the device 500 may select next significant bits of the weights. If all bits of the weights are determined, the device 500 may store 990 the determined weights and can conclude the process 900.

In one example, for each batch, the fake quantization techniques can be leveraged to quantize the network and then, the overall loss function can be computed to update the model parameters. After each epoch, the output channel order can be updated, and after a pre-defined number of epochs, the MSB can be fixed and the next bit can be regularized.

In one aspect, a neural network is trained in a manner that enables segmentation of weights or input strings. In some embodiments, the training process includes the following feature(s). For each batch of training data, fake quantization techniques are used to quantize the neural network, and the overall loss function is computed to update the model parameters. After each epoch, the output channel order is updated and after a pre-defined number of epochs, the most significant bit (MSB) is fixed for the model parameters, and the next (second most significant) bit is regularized. The iterative process can continue until all bits of weights are determined.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   obtaining, by a sequence generator, a weight matrix, the weight matrix including a set of weights for a neural network computation;
   determining, by the sequence generator, a sequence of subsets of weights from the set of weights applied to multiply-accumulate (MAC) circuitries to reduce a number of bit flips at the MAC circuitries, according to hamming distances of the subsets of weights; and maintaining, by the sequence generator, the determined sequence to perform MAC operations of the neural network computation by the MAC circuitries.

2. The method of claim 1, further comprising:
performing, by a first MAC circuitry of the MAC circuitries, a first MAC operation with a first subset of weights from the subsets of weights, according to the determined sequence; and
performing, by the first MAC circuitry, a second MAC operation with a second subset of weights from the subsets of weights after the first MAC operation, according to the determined sequence.

3. The method of claim 1, wherein obtaining, by the sequence generator, the weight matrix includes:
segmenting, by the sequence generator, a base weight matrix into a plurality of sub-matrices, the base weight matrix having a larger number of weights than the weight matrix, wherein the weight matrix is one of the plurality of sub-matrices.

4. The method of claim 3, further comprising:
determining, by the sequence generator, a number of columns of the base weight matrix,
wherein the base weight matrix is segmented into the plurality of sub-matrices, in response to determining that the number of columns of the weight matrix is larger than a predetermined threshold.

5. The method of claim 3, further comprising:
determining, by the sequence generator, a length of a bit string of weights in a row of the weight matrix,
wherein the base weight matrix is segmented into the plurality of sub-matrices, in response to determining that the length of the bit string of weights in the row is larger than a predetermined threshold.

6. The method of claim 3, wherein the plurality of sub-matrices includes an adjacent weight matrix adjacent to the weight matrix, the adjacent weight matrix including another set of weights, the method further comprising:
determining, by the sequence generator, another sequence of additional subsets of weights from the another set of weights applied to the MAC circuitries to reduce a number of bit flips at the MAC circuitries, according to hamming distances of the additional subsets of weights, the another sequence different from the sequence.

7. The method of claim 6, further comprising:
determining, by the sequence generator, an accumulation sequence indicating an association between a first MAC operation based on a first row of weights of the weight matrix, and a second MAC operation based on a second row of weights of the adjacent weight matrix.

8. The method of claim 7, further comprising:
adding, by an adder, a result of the first MAC operation based on the first row of weights of the weight matrix and a second result of the second MAC operation based on the second row of weights, according to the accumulation sequence.

9. The method of claim 1, wherein determining, by the sequence generator, the sequence of the subsets of weights includes:
generating, by the sequence generator, a temporary matrix having weights of the weight matrix,
selecting, by the sequence generator, a first row of weights of the temporary matrix,
determining, by the sequence generator for each of remaining rows of weights of the temporary matrix, a hamming distance with respect to the first row of weights of the temporary matrix, and
determining, by the sequence generator, a row of weights from the remaining rows of the temporary matrix having a smallest hamming distance as a second row of weights of the weight matrix following the first row of weights of the weight matrix.

10. The method of claim 9, wherein determining, by the sequence generator, the sequence of the subsets of weights includes:
removing, by the sequence generator, the determined row of weights from the temporary matrix,
determining, by the sequence generator for each of remaining rows of weights of the temporary matrix, a hamming distance with respect to the subsequent row, and
determining, by the sequence generator, another row of the remaining rows of the temporary matrix having a smallest hamming distance as a third row of weights of the weight matrix following the second row of weights of the weight matrix.

11. A device comprising:
one or more processors configured to:
obtain a weight matrix, the weight matrix including a set of weights for a neural network computation,
determine a sequence of subsets of weights from the set of weights applied to multiply-accumulate (MAC) circuitries to reduce a number of bit flips at the MAC circuitries, according to hamming distances of the subsets of weights, and
maintain the determined sequence to perform MAC operations of the neural network computation by the MAC circuitries.

12. The device of claim 11, wherein the device includes the MAC circuitries, wherein a MAC circuitry of the MAC circuitries is configured to:
perform a first MAC operation with a first subset of weights from the subsets of weights, according to the determined sequence; and
perform a second MAC operation with a second subset of weights from the subsets of weights after the first MAC operation, according to the determined sequence.

13. The device of claim 11, wherein the one or more processors are configured to obtain the weight matrix by:
segmenting a base weight matrix into a plurality of sub-matrices, the base weight matrix having a larger number of weights than the weight matrix, wherein the weight matrix is one of the plurality of sub-matrices.

14. The device of claim 13, wherein the one or more processors are further configured to determine a number of columns of the base weight matrix, wherein the base weight matrix is segmented into the plurality of sub-matrices, in response to determining that the number of columns of the weight matrix is larger than a predetermined threshold.

15. The device of claim 13, wherein the one or more processors are configured to determine a length of a bit string of weights in a row of the weight matrix, wherein the one or more processors are configured to segment the base weight matrix into the plurality of sub-matrices, in response to determining that the length of the bit string of weights in the row is larger than a predetermined threshold.

16. The device of claim 13, wherein the plurality of sub-matrices include an adjacent weight matrix adjacent to the weight matrix, the adjacent weight matrix including another set of weights, wherein the one or more processors are further configured to:
determine another sequence of additional subsets of weights from the another set of weights applied to the MAC circuitries to reduce a number of bit flips at the MAC circuitries, according to hamming distances of the additional subsets of weights, the another sequence different from the sequence.

17. The device of claim 16, wherein the one or more processors are configured to determine an accumulation sequence indicating an association between a first MAC operation based on a first row of weights of the weight matrix and a second MAC operation based on a second row of weights of the adjacent weight matrix.

18. The device of claim 17, wherein the device includes an adder configured to add a result of the first MAC operation based on the first row of weights of the weight matrix and a second result of the second MAC operation based on the second row of weights, according to the accumulation sequence.

19. The device of claim 11, wherein the one or more processors are configured to determine the sequence of the subsets of weights by:

generating a temporary matrix having weights of the weight matrix, selecting a first row of weights of the temporary matrix, determining, for each of remaining rows of weights of the temporary matrix, a hamming distance with respect to the first row of weights of the temporary matrix, and determining a row of weights from the remaining rows of the temporary matrix having a smallest hamming distance as a second row of weights of the weight matrix following the first row of weights of the weight matrix.

20. The device of claim 19, wherein the one or more processors are configured to determine the sequence of the subsets of weights by:

removing the determined row of weights from the temporary matrix, determining, for each of remaining rows of weights of the temporary matrix, a hamming distance with respect to the subsequent row, and determining another row of the remaining rows of the temporary matrix having a smallest hamming distance as a third row of weights of the weight matrix following the second row of weights of the weight matrix.

* * * * *